(12) United States Patent
Mizutani et al.

(10) Patent No.: US 8,337,101 B2
(45) Date of Patent: Dec. 25, 2012

(54) IMAGING DEVICE

(75) Inventors: Tomonori Mizutani, Osaka (JP); Makoto Iyoda, Osaka (JP); Hisanori Sasaki, Osaka (JP); Ryuichi Nagaoka, Osaka (JP); Yasuhiro Miyamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 5 days.

(21) Appl. No.: 13/056,368

(22) PCT Filed: Jun. 25, 2010

(86) PCT No.: PCT/JP2010/004237
§ 371 (c)(1),
(2), (4) Date: Jan. 28, 2011

(87) PCT Pub. No.: WO2010/150553
PCT Pub. Date: Dec. 29, 2010

(65) Prior Publication Data
US 2011/0129211 A1 Jun. 2, 2011

(30) Foreign Application Priority Data
Jun. 26, 2009 (JP) ................... 2009-151951

(51) Int. Cl.
*G03B 17/00* (2006.01)
(52) U.S. Cl. .................... 396/439; 396/419; 396/535
(58) Field of Classification Search .................. 396/439, 396/419, 535; 248/187.1
See application file for complete search history.

(56) References Cited

U.S. PATENT DOCUMENTS

| | | | | |
|---|---|---|---|---|
| 7,494,290 B2 * | 2/2009 | Kim | ............... | 396/419 |
| 7,614,803 B2 * | 11/2009 | Takeuchi | ............... | 396/419 |
| 2007/0104480 A1 | 5/2007 | Shiozaki et al. | | |
| 2010/0068003 A1 * | 3/2010 | Wagner | ............... | 411/386 |
| 2010/0230565 A1 * | 9/2010 | Walsh | ............... | 248/205.4 |
| 2010/0308576 A1 * | 12/2010 | Nakata | ............... | 285/314 |
| 2010/0329776 A1 * | 12/2010 | Durling | ............... | 403/342 |

FOREIGN PATENT DOCUMENTS

| | | |
|---|---|---|
| JP | S57-14132 | 1/1982 |
| JP | H2-44728 | 3/1990 |
| JP | H8-201902 | 8/1996 |
| JP | 2007-127836 | 5/2007 |
| JP | 2009-80420 | 4/2009 |

OTHER PUBLICATIONS

International Search Report of PCT application No. PCT/JP2010/004237 dated on Jul. 27, 2010.

* cited by examiner

*Primary Examiner* — W. B. Perkey
*Assistant Examiner* — Linda B Smith
(74) *Attorney, Agent, or Firm* — Panasonic Patent Center

(57) ABSTRACT

An imaging device to which a support can be attached includes a support attachment unit and a support body unit. The support attachment unit includes a first threaded hole configured to be attached to the support, and an exposure face formed around the entrance of the first threaded hole. The support body unit includes a housing having an opening configured to expose the exposure face and an outer surface formed around the opening, and movably supports the support attachment unit. The support attachment unit is disposed at a first position when the support is not attached, and is disposed at a second position when the support is attached. The exposure face is disposed more to the inside of the housing than the outer surface when the support attachment unit is disposed at the first position.

21 Claims, 10 Drawing Sheets

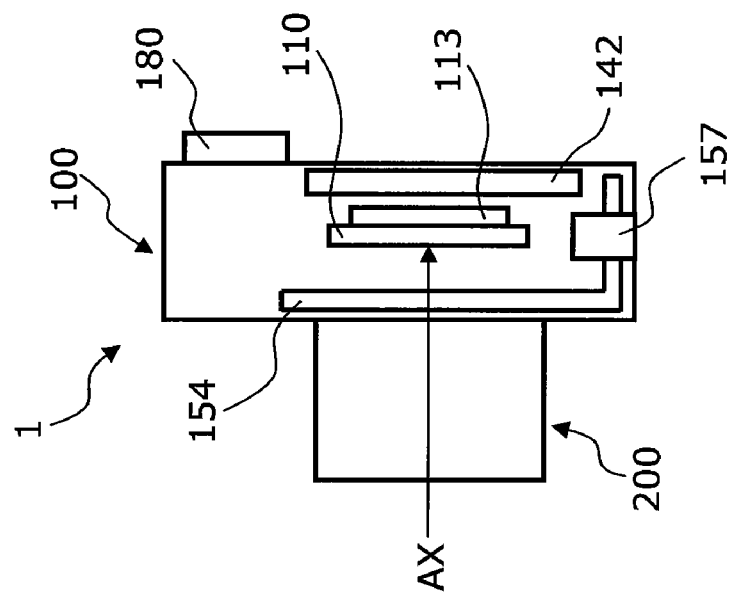
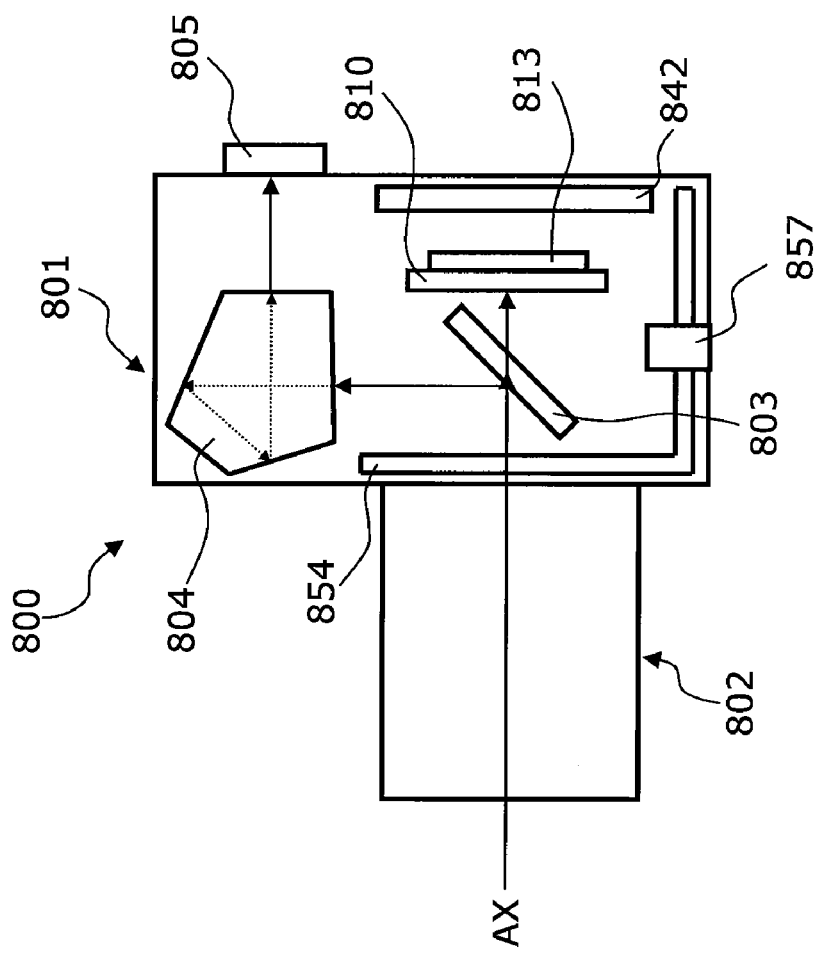

IMAGING DEVICE

CROSS-REFERENCE TO RELATED APPLICATIONS

This application claims priority under 35 U.S.C. §119 to Japanese Patent Application No. 2009-151951 filed on Jun. 26, 2009. The entire disclosure of Japanese Patent Applications No. 2009-151951 is hereby incorporated herein by reference.

TECHNICAL FIELD

The present invention relates to an imaging device to which a support can be attached.

BACKGROUND ART

An example of a known imaging device is an interchangeable lens type of digital camera (see Patent Literature 1, for example). The camera discussed in Patent Literature 1 comprises a lens unit and a camera body. This camera body has a CCD (charge coupled device) image sensor or another such imaging element, and a mirror box device disposed between the lens unit and the imaging element. The mirror box device guides light that has passed through the lens unit to the CCD image sensor or a prism. Light guided to the prism is then guided by the prism to a viewfinder.

The above-mentioned imaging device is sometimes provided with a support attachment unit for attaching a tripod, a monopod, or another such support. For instance, there is a known interchangeable lens digital camera with which a tripod attachment unit is fixed to the bottom face. Attaching a tripod, which supports the digital camera, to the support attachment unit allows imaging to be performed with the orientation of the digital camera stabilized.

CITATION LIST

Patent Literature

Patent Literature 1: Japanese Laid-Open Patent Application 2007-127836

SUMMARY

Technical Problem

There has long been a need for more compact imaging devices. For example, with an interchangeable lens type of digital camera, there is a need to reduce the size of the camera body.

However, reducing the size of the camera body means that the parts are disposed more closely together, so the distance between the support attachment unit and electronic parts that generate heat (such as the imaging element or the substrate on which a camera controller is mounted) is shorter than with a conventional camera body.

Also, since higher image quality leads to higher power consumption by the imaging element and the camera controller, these electronic parts generate even more heat. As a result, the heat generation density around the electronic parts is higher, and there is the danger that the heat generated by these electronic parts will be transmitted to the support attachment unit, raising the temperature of the support attachment unit. If the user touches the support attachment unit and feels a difference between the temperature of the support attachment unit and the surrounding temperature, this can cause the user some discomfort.

Meanwhile, it is preferable to dispose a support close to the support attachment unit serving as the support point so that the support can hold up the imaging device. That is, it is preferable for the support attachment unit to be disposed at a position suited to attachment of the support.

Solution to Problem

An imaging device disclosed herein to which a support can be attached comprises a support attachment unit and a support body unit. The support attachment unit includes a first threaded hole configured to be attached to the support, and an exposure face formed around the entrance of the first threaded hole. The support body unit includes a housing having an opening configured to expose the exposure face and an outer surface formed around the opening, and movably supports the support attachment unit. The support attachment unit is disposed at a first position when the support is not attached, and is disposed at a second position when the support is attached. The exposure face is disposed more to the inside of the housing than the outer surface when the support attachment unit is disposed at the first position. Also, the exposure face and the outer surface are disposed within the same plane when the support attachment unit is disposed at the second position, or the support attachment unit protrudes from the outer surface at the second position.

Here, the "support" is a fixing mechanism that is attached to the imaging device to stabilize the orientation of the imaging device during imaging. Examples of a support include a tripod and a monopod.

Also, the "imaging device" referred to here is a concept that encompasses not only an imaging device that is capable of imaging by itself, but also a camera body. For example, the imaging device includes the camera body of an interchangeable lens type of camera to which a lens unit can be mounted.

Also, "the exposure face and the outer surface are disposed within the same plane" refers to the relation between the exposure face and the outer surface when the exposure face and the outer surface are touching a common plane. For example, it can be said that the exposure face and the outer surface are disposed in the same plane when the exposure face is touching a plane obtained by extending the outer surface.

With this imaging device, since the exposure face is disposed more to the inside of the housing than the outer surface when the support is not attached to the support attachment unit, the exposure face can be disposed at a position that the user is unlikely to touch. Therefore, this reduces the frequency at which the user will touch the support attachment unit and feel a difference between the temperature of the support attachment unit and the surrounding temperature. Meanwhile, when the support is attached to the support attachment unit, the exposure face and the outer surface are disposed within the same plane, or the support attachment unit protrudes from the outer surface, so the support attachment unit can be moved closer to the support.

Advantageous Effects

Thus, with this imaging device, it is less likely that the user will touch the support attachment unit and experience discomfort, and the support attachment unit can be disposed at a position that is suited to the attachment of the support.

BRIEF DESCRIPTION OF DRAWINGS

FIG. 6A is a simplified cross section of a single lens reflex camera 800, and

FIG. 6B is a simplified cross section of the digital camera 1;

DESCRIPTION OF EMBODIMENTS

First Embodiment 1-1: Overview of Digital Camera

Figure 1:
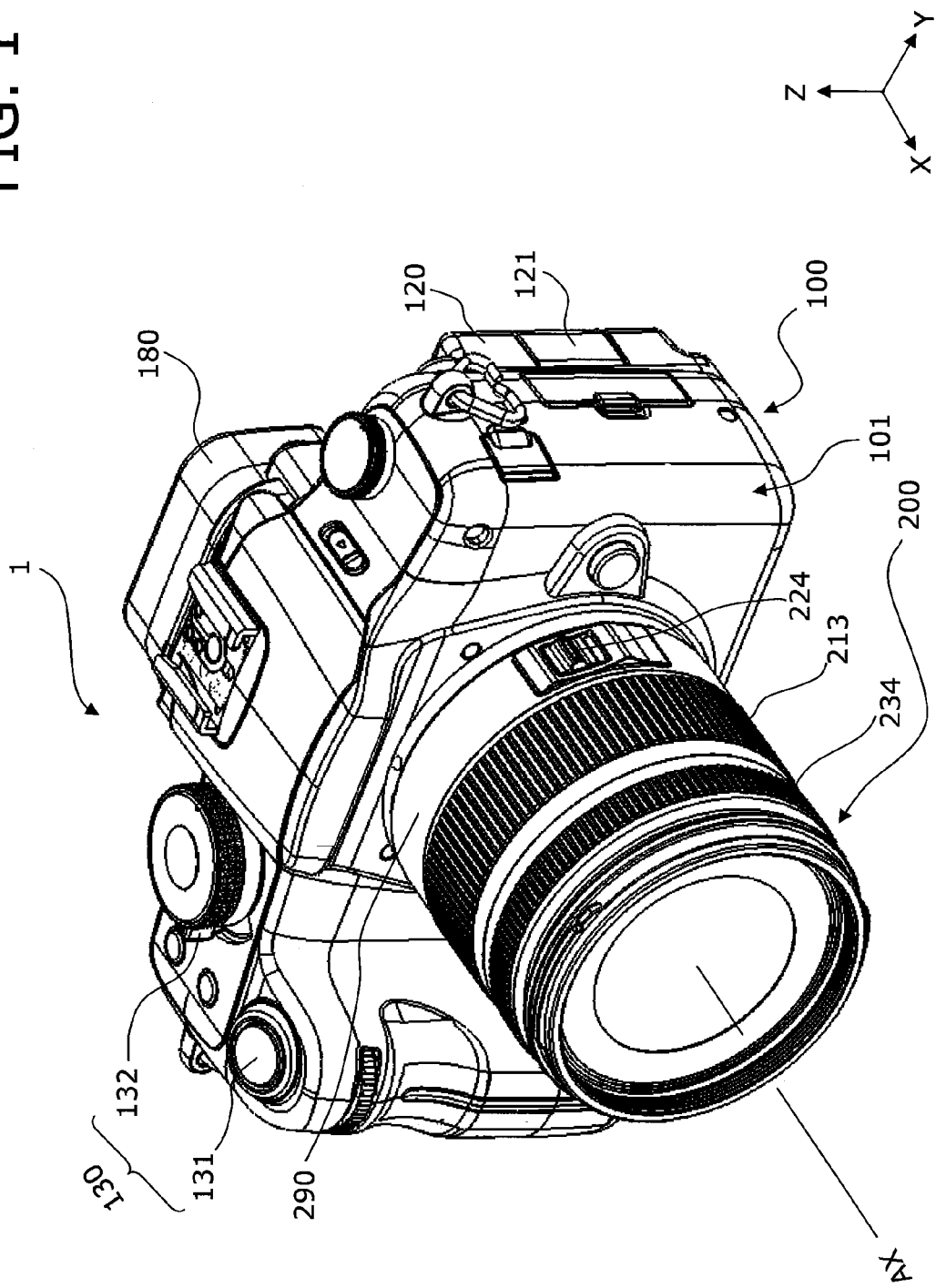
FIG. 1 is an oblique view of a digital camera 1.
Figure 2:
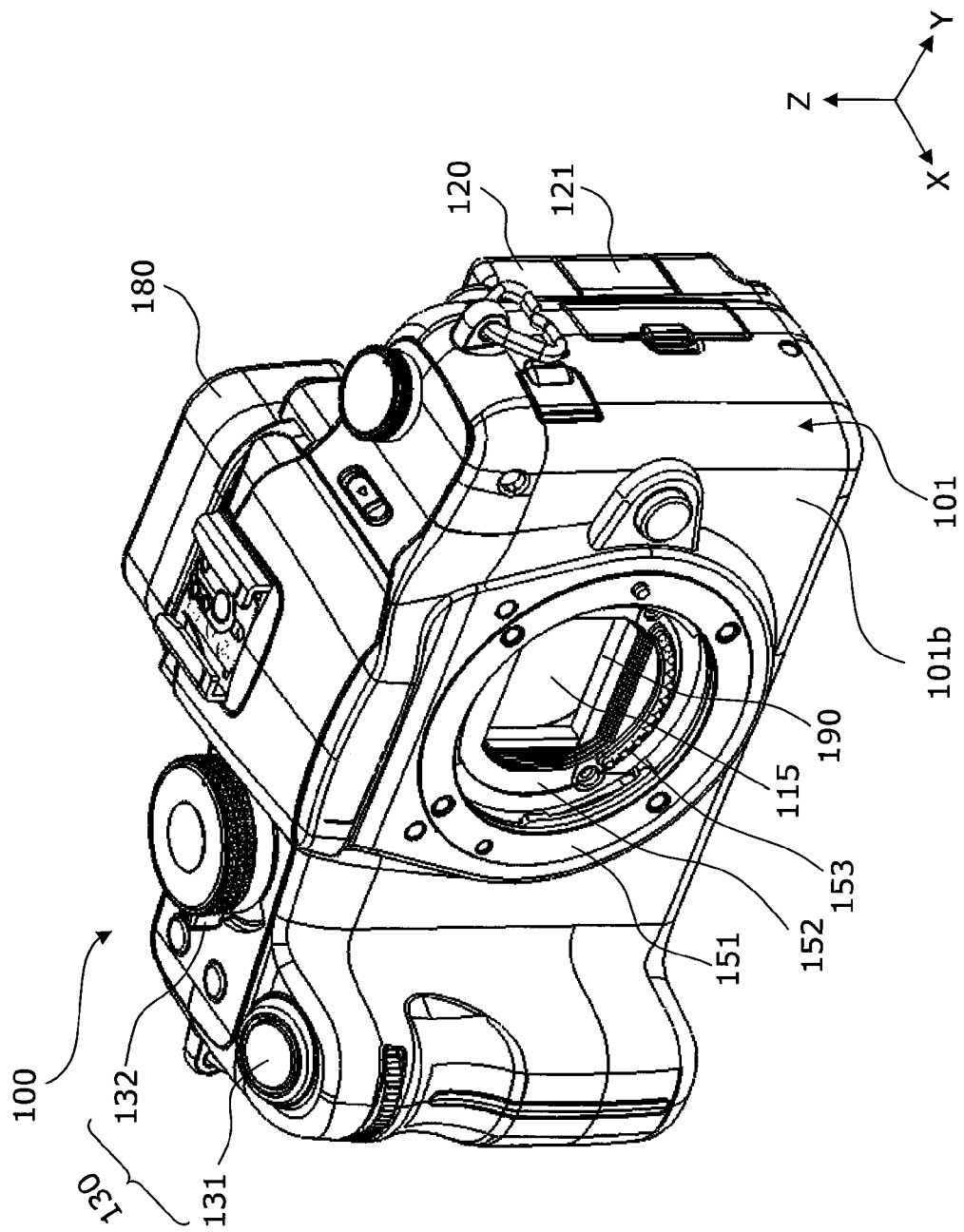
FIG. 2 is an oblique view of a camera body 100.
Figure 3:
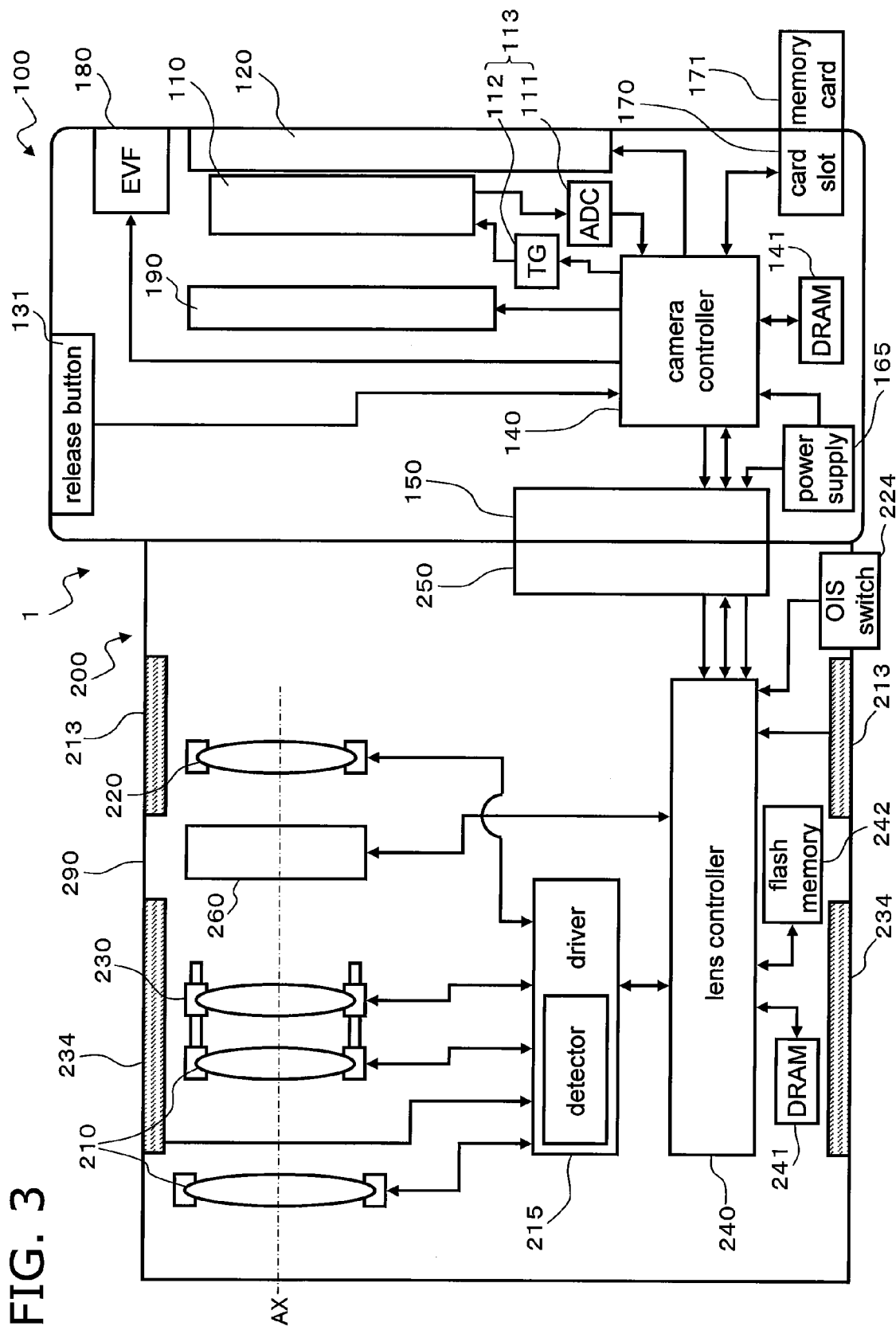
FIG. 3 is a block diagram of the digital camera 1.

FIG. 1 is an oblique view of a digital camera 1 (an example of an imaging device) having a camera body 100 according to a first embodiment. FIG. 2 is an oblique view of the camera body 100. FIG. 3 is a function block diagram of the digital camera 1.

The digital camera 1 is an interchangeable lens digital camera for acquiring an image of a subject, and comprises a camera body 100 and a lens unit 200 that can be mounted to the camera body 100.

Unlike a single lens reflex camera, the camera body 100 has no mirror box device, so the flange back is smaller than with a conventional single lens reflex camera. A smaller flange back also makes the camera body 100 more compact. Furthermore, reducing the size of the flange back affords greater latitude in the design of the optical system, so the lens unit 200 can be smaller. The various components will be described in detail below.

To facilitate description, the subject side of the digital camera 1 will be called the front, the imaging face side will be called the rear or back, the vertically upper side in the normal orientation of the digital camera 1 (hereinafter also referred to as landscape orientation) will be called the top or upper side, and the vertically lower side will be called the bottom or lower side.

The landscape orientation referred to here is an orientation in which the direction in which a release button 131 (FIG. 1) is pressed during imaging substantially coincides with the vertically downward direction when the direction parallel to the long sides of a rectangular image that is wider than it is long coincides with the horizontal direction of the subject within the image, and the direction parallel to the short sides of the image coincides with the vertical direction of the subject within the image.

The right side when the digital camera 1 is viewed from the opposite side from the subject in the landscape orientation of the digital camera 1 will be called the right or right side. Similarly, the left side when the digital camera 1 is viewed from the opposite side from the subject in the landscape orientation of the digital camera 1 will be called the left or left side.

The vertical direction in the landscape orientation of the digital camera 1 will be called the up and down direction or the vertical direction. Similarly, the direction to the left and right in the landscape orientation of the digital camera 1 will be called the left and right direction or the lateral direction.

Also, a direction perpendicular to the up and down direction and the left and right direction coincides with the fore and aft direction, a direction facing the subject will be called the forward direction, and the direction opposite to the forward direction will be called the rearward direction.

In the following description, a three-dimensional coordinate axes is defined as shown in FIG. 1. In FIG. 1, the X axis direction coincides with the fore and aft direction, the Y axis direction coincides with the left and right direction, and the Z axis direction coincides with the up and down direction. The coordinate axes in the drawings other than FIG. 1 are based on the three-dimensional coordinate axes set in FIG. 1.

1-2: Configuration of Camera Body

Figure 4:
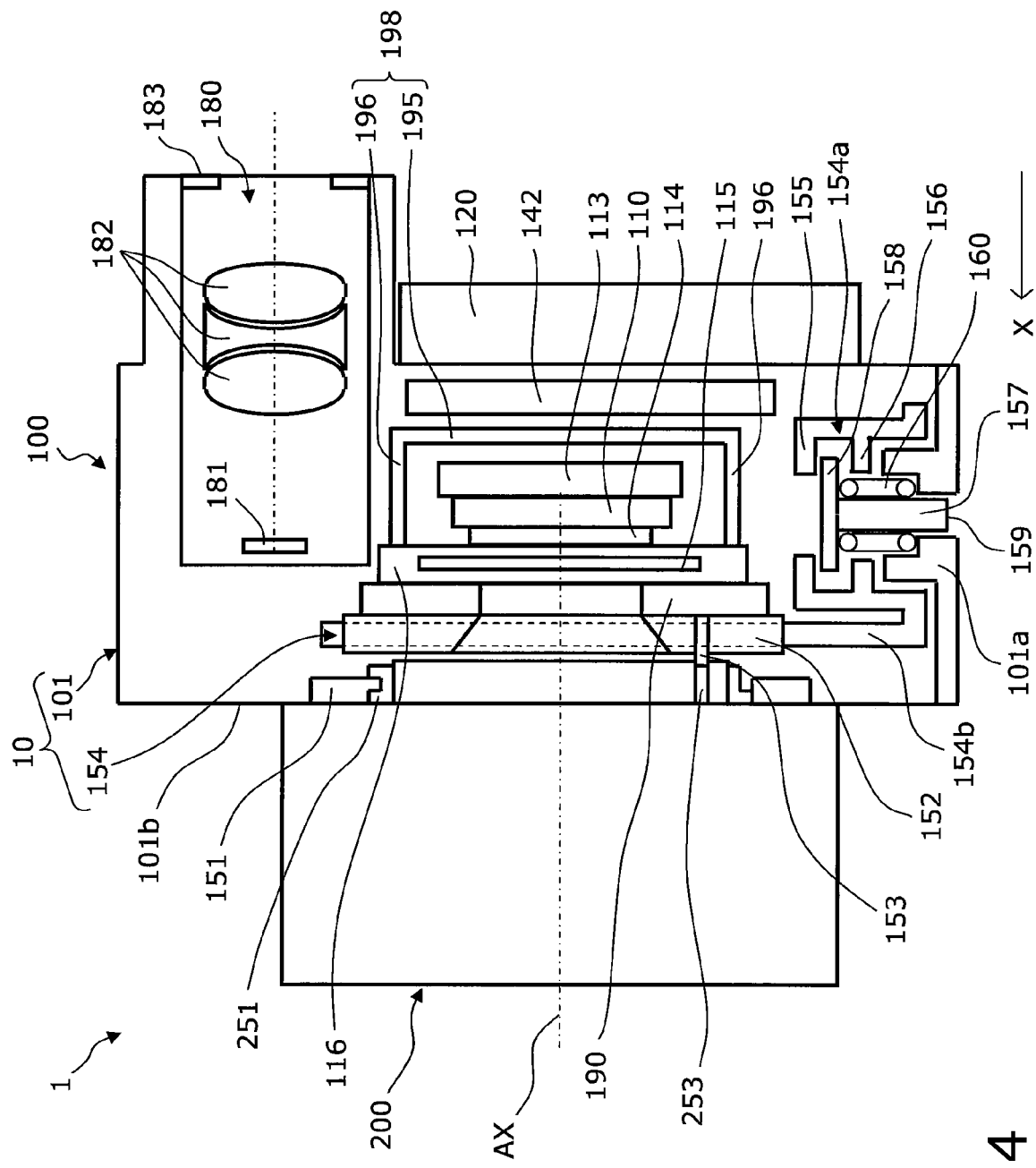
FIG. 4 is a simplified cross section of the digital camera 1.
Figure 5:
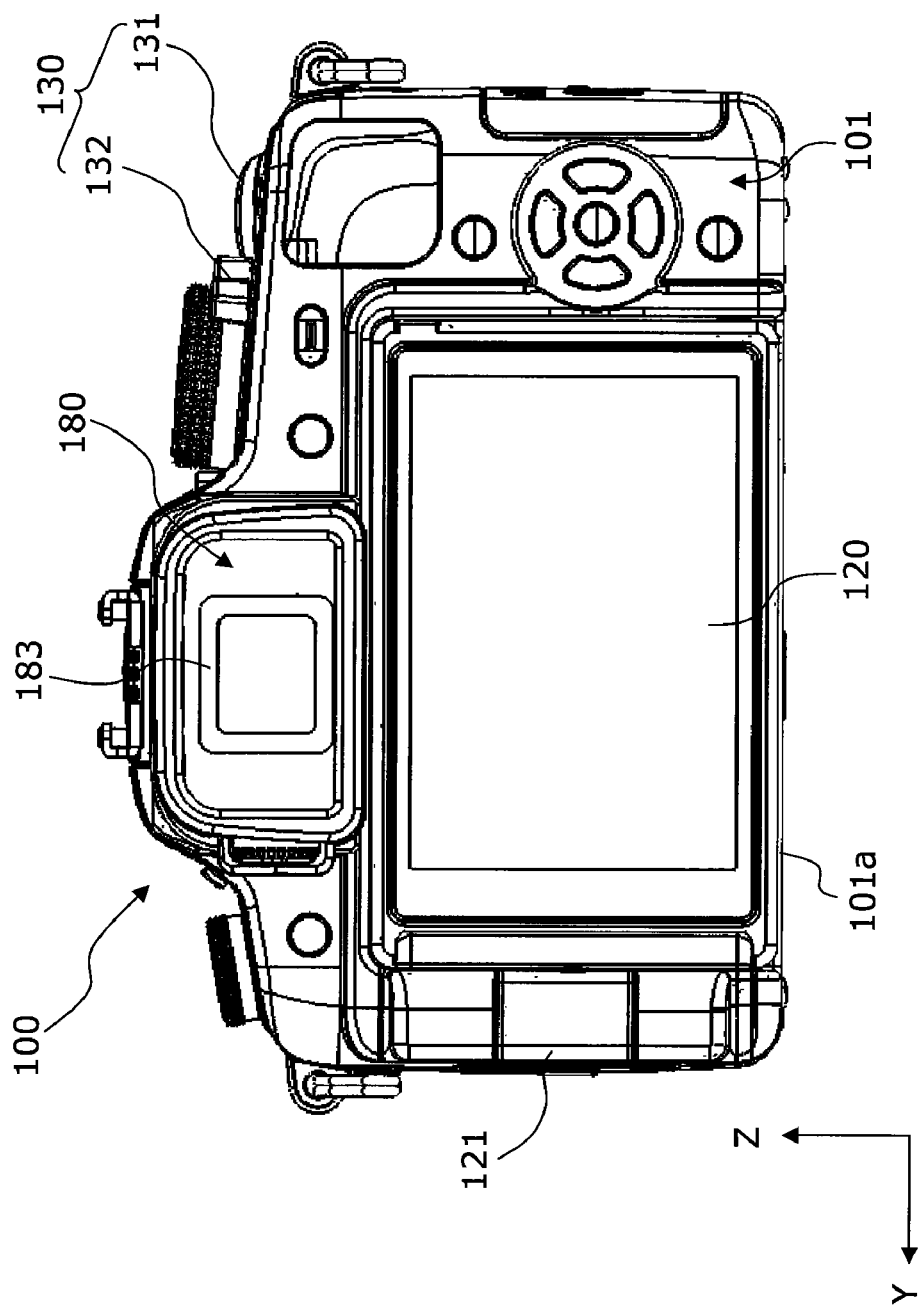
FIG. 5 is a rear view of the camera body 100.

FIG. 4 is a simplified cross section of the digital camera 1. FIG. 5 is a rear view of the camera body 100. The camera body 100 (an example of an imaging device) mainly comprises a CMOS (complementary metal oxide semiconductor) image sensor 110, a CMOS circuit board 113, a camera monitor 120, a manipulation portion 130, a main circuit board 142 (which includes a camera controller 140), a body mount 150, a power supply 165, a card slot 170, an electronic viewfinder 180, a shutter unit 190, an optical low pass filter 114, a diaphragm 115, a main frame 154, a support attachment unit 157, a coil spring 160, a heat diffuser 198, and a housing 101.

Housing

The housing 101 is a member that forms the outer faces of the camera body 100, and includes a housing bottom portion 101a and a housing front portion 101b. The housing bottom portion 101a is disposed on the lower side of the CMOS image sensor 110 in landscape orientation, and the housing front portion 101b is disposed on the subject side.

The body mount 150, the shutter unit 190, the diaphragm 115, the optical low pass filter 114, the CMOS image sensor 110, the CMOS circuit board 113, a heat diffusing plate 195, the main circuit board 142, and the camera monitor 120 are disposed in that order, starting at the front, on the camera body 100. Part of the main frame 154 is disposed at a position that overlaps the body mount 150 in a direction parallel to the optical axis AX (hereinafter also referred to as the optical axis direction).

The CMOS Image Sensor

The CMOS image sensor 110 converts an optical image of a subject (hereinafter also referred to as a subject image) incident via the lens unit 200 into image data. The image data thus produced is digitized by an A/D converter 111 on the CMOS circuit board 113. The image data digitized by the A/D converter 111 is subjected to various image processing by the camera controller 140. Examples of the various image processing referred to here include gamma correction processing, white balance correction processing, scratch correction processing, YC conversion processing, electronic zoom processing, and JPEG compression processing. The function of the CMOS circuit board 113 may be included in the CMOS image sensor 110 or in the main circuit board 142.

The CMOS image sensor 110 operates on the basis of timing signals generated by a timing generator 112 of the CMOS circuit board 113. The CMOS image sensor 110 acquires still picture data and moving picture data under the control of the CMOS circuit board 113. The acquired moving picture data is also used in the display of a through image. The still picture data and moving picture data here are examples of image data.

The "through image" referred to here is an image for which data is not recorded to a memory card 171, out of the moving picture data. The through image is mainly a moving picture, and is displayed on the camera monitor 120 and/or the electronic viewfinder 180 (hereinafter also referred to as EVF) in order to decide on the composition of a moving picture or still picture.

The CMOS image sensor 110 is capable of acquiring a low-resolution moving picture used as a through image, and of acquiring a high-resolution moving picture used for recording. An example of a high-resolution moving picture is an HD-size (high-definition size: 1920×1080 pixels) moving picture. The CMOS image sensor 110 is an example of an imaging element that converts an optical image of a subject into an electrical image signal. Thus, the imaging element is an electronic part that produces electrical signals expressing images, and it is a concept that encompasses not only the CMOS image sensor 110, but also a CCD image sensor and other such opto-electric conversion elements.

The CMOS circuit board 113 is a circuit board that controls the CMOS image sensor 110. The CMOS circuit board 113 is also a circuit board that subjects the image data outputted from the CMOS image sensor 110 to specific processing. The CMOS circuit board 113 includes the timing generator 112 and the A/D converter 111. The CMOS circuit board 113 is an example of an imaging element circuit board that controls the drive of the imaging element and subjects the image data outputted from the imaging element to A/D conversion and other such specific processing.

Camera Monitor

The camera monitor 120 is a liquid crystal display, for example, and displays an image expressed by the display-use image data, etc. The display-use image data is produced by the camera controller 140. The display-use image data is image data that has undergone image processing, or data for displaying the imaging conditions of the digital camera 1, a control menu, or the like as an image, for example. The camera monitor 120 is capable of selectively displaying both moving and still pictures.

The camera monitor 120 is arranged to the camera body 100. In this embodiment, it is disposed on the rear face of the camera body 100, but the camera monitor 120 may be disposed anywhere on the camera body 100. The angle of the display face of the camera monitor 120 with respect to the camera body 100 is variable. More specifically, as shown in FIG. 5, the camera body 100 has a hinge 121 that links the camera monitor 120 rotatably with respect to the housing 101. The hinge 121 is disposed at the left end of the housing 101. More precisely, the hinge 121 is made up of a first hinge and a second hinge. The camera monitor 120 is able to rotate around the first hinge in the left and right direction with respect to the housing 101, and is able to rotate around the second hinge in the up and down direction with respect to the housing 101.

The camera monitor 120 is an example of a display unit arranged to the camera body 100. Other examples of display units include an organic electroluminescent device, an inorganic electroluminescent device, a plasma display panel, and other such devices that allow images to be displayed. The display unit need not be disposed on the rear face of the camera body 100, and may instead be arranged to a side face, the top face, or another such place.

Electronic Viewfinder

The electronic viewfinder 180 displays the image expressed by the display-use image data, etc., produced by the camera controller 140. The EVF 180 is capable of selectively displaying both moving and still pictures. The EVF 180 and the camera monitor 120 may both display the same content, or may display different content. They are both controlled by the camera controller 140. The EVF 180 has an EVF-use liquid crystal monitor 181 that displays images and the like, an EVF-use optical system 182 that enlarges the display of the EVF-use liquid crystal monitor 181, and an eyepiece 183 up to which the user puts an eye.

The EVF 180 is also an example of a display unit. It differs from the camera monitor 120 in that the user puts an eye up to it. The difference in terms of structure is that whereas the EVF 180 has the eyepiece 183, the camera monitor 120 does not have an eyepiece 183.

The proper display brightness of the EVF-use liquid crystal monitor 181 is ensured by arranging a back light (not shown) in the case of a transmission type of liquid crystal, and a front light in the case of a reflection type of liquid crystal. The EVF-use liquid crystal monitor 181 is an example of an EVF-use monitor. The EVF-use monitor can be an organic electroluminescent device, and inorganic electroluminescent device, a plasma display panel, or another such device that allows images to be displayed. There is no need for an illumination light source in the case of an organic electroluminescent device or other such self-emitting device.

Manipulation Portion

The manipulation portion 130 receives commands by user manipulation. More specifically, as shown in FIGS. 1 and 2, the manipulation portion 130 has a release button 131 that is used for shutter operation by the user, and a power switch 132 that is a rotary dial switch arranged to the top face of the camera body 100. The power switch 132 is such that the power is off in a first rotation position, and the power is on in a second rotation position. The manipulation portion 130 encompasses a button, lever, dial, touch panel, or the like, so long as it can be operated by the user.

Camera Controller

The camera controller 140 is a device that serves as the command center of the camera body 100, and controls the various components of the camera body 100. For example, the camera controller 140 controls the shutter unit 190 so that the shutter unit 190 is held open when the supply of power from the power supply 165 has been stopped. The camera controller 140 also receives instructions from the manipulation portion 130. The camera controller 140 sends signals for controlling the lens unit 200 through the body mount 150 and a lens mount 250 to a lens controller 240, and indirectly controls the various components of the lens unit 200. In other words, the camera controller 140 controls the entire digital camera 1.

The camera controller 140 also receives various kinds of signals from the lens controller 240 via the body mount 150 and the lens mount 250. The lens controller 240 uses a DRAM 241 as a working memory during control operation or image processing operation. The camera controller 140 is an example of a body controller (or a body microprocessor). The camera controller 140 is disposed on the main circuit board 142.

Card Slot and Memory Card

The card slot 170 allows the memory card 171 to be inserted. The card slot 170 controls the memory card 171 on the basis of a control signal sent from the camera controller 140. More specifically, the card slot 170 stores still picture data on the memory card 171 and outputs still picture data from the memory card 171. Also, the card slot 170 stores moving picture data on the memory card 171 and outputs moving picture data from the memory card 171.

The memory card 171 is able to store the image data produced by the camera controller 140 in image processing. For instance, the memory card 171 can store uncompressed raw image files, compressed JPEG image files, or the like. Also, image data or image files that have been internally stored ahead of time can be outputted from the memory card 171 via the card slot 170. The image data or image files outputted from the memory card 171 are subjected to image processing by the camera controller 140. For example, the camera controller 140 produces display-use image data by subjecting the image data or image files acquired from the memory card 171 to expansion processing.

The memory card 171 is further able to store moving picture data produced by the camera controller 140 in image processing. For instance, the memory card 171 can store moving picture files compressed according to H.264/AVC, which is a video compression standard. The memory card 171 can also output, via the card slot 170, moving picture data or moving picture files internally stored ahead of time. The moving picture data or moving picture files outputted from the memory card 171 are subjected to image processing by the camera controller 140. For example, the camera controller 140 subjects the moving picture data or moving picture files acquired from the memory card 171 to expansion processing and produces display-use video data.

The memory card 171 is an example of a memory unit. The memory unit may be one that can be mounted to the camera body 100, such as the memory card 171, or may be one that is fixed to the digital camera 1.

Power Supply

The power supply 165 supplies electrical power to the various components of the digital camera 1. The power supply 165 may, for example, be a dry cell, or may be a rechargeable cell. The power supply 165 also may be a unit that receives power externally via a power cord or the like and supplies power to the digital camera 1.

Body Mount

The body mount 150 allows the lens unit 200 to be mounted, and includes a body mount ring 151 and an electrical contact 153. The body mount 150 can be mechanically and electrically connected to the lens mount 250 of the lens unit 200.

The body mount ring 151 is a ring-shaped member arranged to the housing front portion 101b of the housing 101, and mechanically supports the lens unit 200 by mating with a lens mount ring 251 arranged to the lens unit 200. The lens mount ring 251 is fitted together with the body mount ring 151 by what is known as a bayonet mechanism. More specifically, the lens mount ring 251 can assume a first state in which it is not mated with the body mount ring 151, and a second state in which it is mated with the body mount ring 151, according to the rotational position relation with the body mount ring 151 around the optical axis.

More precisely, the lens mount ring 251 can assume a first state in which it can move in the optical axis direction with respect to the body mount ring 151. In this first state, the lens mount ring 251 can be inserted into the body mount ring 151. When the lens mount ring 251 is rotated with respect to the body mount ring 151 in a state of having been inserted into the body mount ring 151, the lens mount ring 251 fits together with the body mount ring 151. The rotational position relation between the body mount ring 151 and the lens mount ring 251 at this point is the second state.

The body mount ring 151 needs to have a certain amount of strength to support the lens mount ring 251, so the body mount ring 151 is preferably formed from metal. In this embodiment, the body mount ring 151 is formed from metal.

In a state in which the lens unit 200 is mounted to the camera body 100, the electrical contact 153 is in contact with an electrical contact 253 had by the lens mount 250. Thus, the body mount 150 and the lens mount 250 can be electrically connected via the electrical contact 153 of the body mount 150 and the electrical contact 253 of the lens mount 250. Therefore, the digital camera 1 can send and receive data and/or control signals between the camera body 100 and the lens unit 200 via the body mount 150 and the lens mount 250. More specifically, the body mount 150 and the lens mount 250 can send and receive data and/or control signals between the camera controller 140 and the lens controller 240 included in the lens unit 200. Also, the body mount 150 supplies electrical power received from the power supply 165 to the entire lens unit 200 via the lens mount 250.

The body mount 150 is supported by the main frame 154 via a body mount support portion 152. More precisely, the body mount support portion 152 is connected to the body mount ring 151, and supports the body mount ring 151.

The body mount support portion 152 is supported by the main frame 154, and is disposed between the body mount ring 151 and the shutter unit 190.

Shutter Unit

The shutter unit 190 is what is known as a focal plane shutter, and is able to shield the CMOS image sensor 110 from light. The shutter unit 190 is disposed between the body mount 150 and the CMOS image sensor 110. The shutter unit 190 has a front curtain, a rear curtain, and a shutter support frame. The shutter support frame is provided with an opening through which passes light guided from the subject to the CMOS image sensor 110. The shutter unit 190 adjusts the exposure time of the CMOS image sensor 110 by moving the front curtain and rear curtain to and from the opening in the shutter support frame. The shutter unit 190 can mechanically maintain an open state. The phrase "mechanically maintain" here is a concept of maintaining an open state without the use of electrical power, and includes, for example, maintenance by engagement between two objects, and the use of a permanent magnet.

Optical Low Pass Filter and Diaphragm

The optical low pass filter 114 eliminates the high-frequency component of the light incident from the subject. More specifically, the optical low pass filter 114 separates a subject image formed by the lens unit 200 so that the resolution is coarser than the pitch of the pixels of the CMOS image sensor 110. In general, the CMOS image sensor 110 or other imaging element has an RGB color filter called a Bayer pattern, or a YCM complementary color filter, provided for each pixel. Therefore, if the resolution goes to one pixel, not only will a false color be generated, but if the subject is a repeating pattern, an unattractive moire will result. Furthermore, the optical low pass filter 114 has an Ir cut filter function for cutting out infrared light.

The diaphragm 115 is disposed in front of the CMOS image sensor 110, is supported by a diaphragm support unit 116, and prevents dust from clinging to the CMOS image sensor 110. Also, any dust clinging to the diaphragm 115 itself is knocked off by the vibration of the diaphragm 115. More specifically, the diaphragm 115 includes a thin, transparent sheet-like member, a piezoelectric element, and a fixing member that fixes the sheet-like member via the piezoelectric element. When AC voltage is applied and the piezoelectric element vibrates, the sheet-like member vibrates. The diaphragm support unit 116 supports the diaphragm 115 so that it is disposed at a specific position with respect to the CMOS image sensor 110. The diaphragm support unit 116 is supported by the main frame 154 via the body mount 150 and the shutter unit 190.

Support Body Unit

Figure 7A:
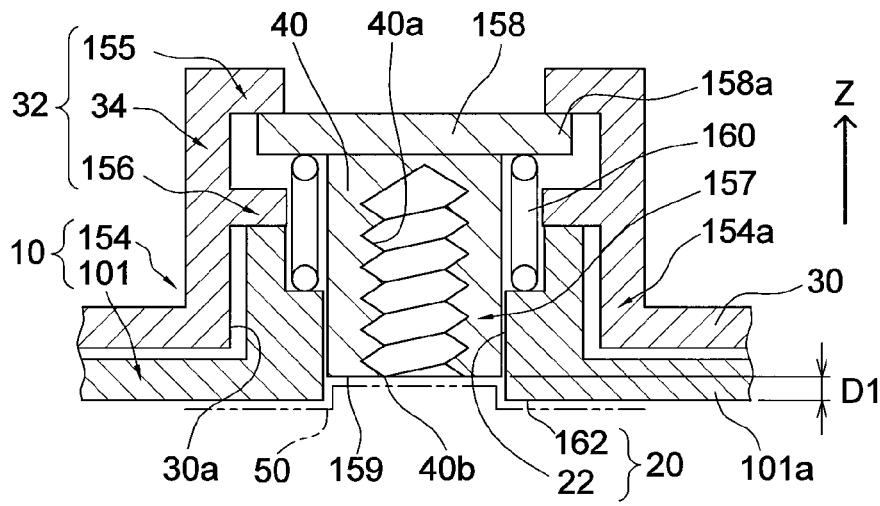
FIG. 7A is a cross section of a support attachment unit 157 and a support body unit 10 when the support has not been attached.
Figure 7B:
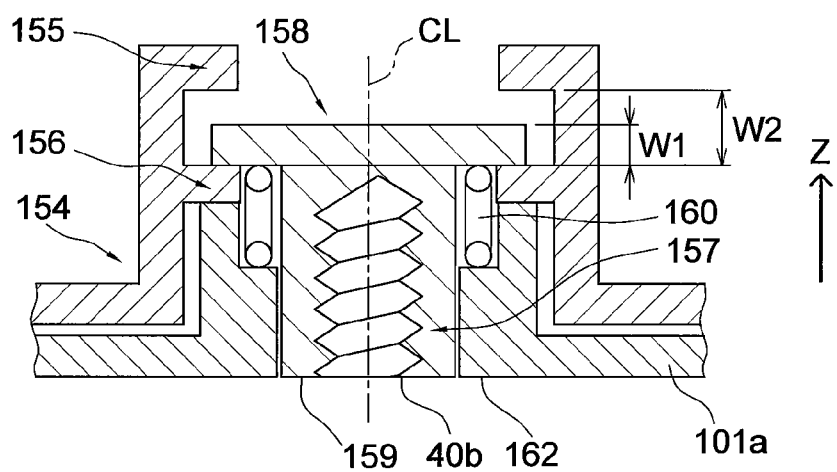
FIG. 7B is a cross section of the support attachment unit 157 and the support body unit 10 when the support has been attached.

As shown in FIGS. 7A and 7B, the support body unit 10 is a unit that movably supports the support attachment unit 157, and includes the housing 101 and the main frame 154.

As discussed above, the housing 101 has the housing bottom portion 101a. An opening part 20 is formed in the housing bottom portion 101a. The opening part 20 has an opening 22 formed in the housing bottom portion 101a, and an outer surface 162. The support attachment unit 157 is exposed through the opening 22.

The opening 22 (an example of an opening) passes through in the center line CL direction (discussed below). The support attachment unit 157 is slidably inserted into the opening 22. More specifically, the main body 40 (discussed below) of the support attachment unit 157 is inserted into the opening 22, and a gap is formed between the main body 40 and the opening 22. The opening 22 guides the support attachment unit 157 in the center line CL direction when the support attachment unit 157 moves.

The outer surface 162 is a substantially flat face formed around the opening 22, and is exposed to the outside. In this embodiment, when the support is attached to the support attachment unit 157, the outer surface 162 comes into contact with the support.

The main frame 154 (an example of a frame) has a frame bottom portion 154a and a frame front portion 154b, and is disposed in the interior of the housing 101 of the camera body 100. The main frame 154 is disposed along the housing front portion 101b and the housing bottom portion 101a inside the camera body 100. More precisely, the frame front portion 154b is disposed along the housing front portion 101b of the camera body 100, and the frame bottom portion 154a is disposed along the housing bottom portion 101a of the camera body 100.

The frame front portion 154b is connected to the body mount support portion 152. That is, the main frame 154 supports the lens unit 200 via the body mount 150 and the body mount support portion 152. Accordingly, the main frame 154 needs to have a certain amount of strength. Therefore, the main frame 154 is preferably formed from metal. Examples of the material of the main frame 154 include aluminum, and stainless steel alloys.

The frame bottom portion 154a has a plate portion 30 and a positioning portion 32. The plate portion 30 is formed in a flat shape, and is disposed along the housing bottom portion 101a. A through-hole 30a is formed in the plate portion 30 at a position corresponding to the opening 22.

The positioning portion 32 is used to limit the movement of the support attachment unit 157 with respect to the support body unit 10, and has a column portion 34, a first receiver 155, and a second receiver 156.

The column portion 34 protrudes to the inside of the housing 101 from the plate portion 30, and comprises a first column portion 34a, a second column portion 34b, a third column portion 34c, and a fourth column portion 34d. The first to fourth column portions 34a to 34d are disposed around the through-hole 30a.

Figure 7C:
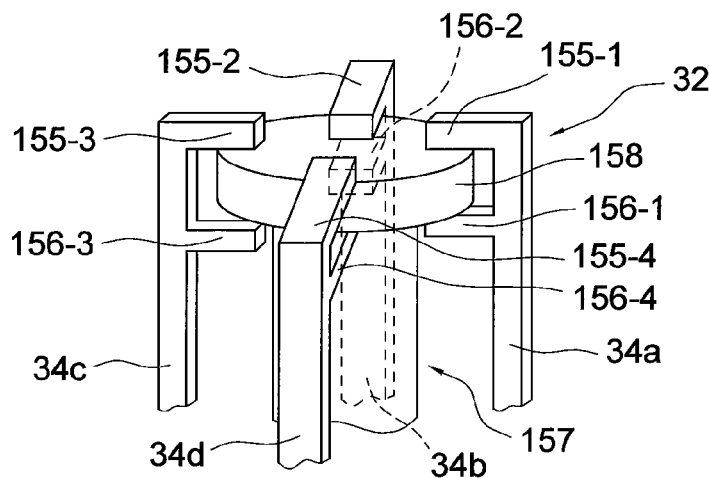
FIG. 7C is an oblique view of the support attachment unit 157 and a positioning portion 32.

As shown in FIG. 7C, the first to fourth column portions 34a to 34d surround the support attachment unit 157. More specifically, the first column portion 34a and the third column portion 34c face each other with the support attachment unit 157 in between. Also, the second column portion 34b and the fourth column portion 34d face each other with the support attachment unit 157 in between.

The first receiver 155 is fixed to the end of the column portion 34 on the opposite side from the outer surface 162, and limits movement of the support attachment unit 157.

The second receiver 156 is disposed between the first receiver 155 and the outer surface 162, and limits movement of the support attachment unit 157. The second receiver 156 is formed integrally with the column portion 34, for example.

The first receiver 155 has four first protrusions 155-1 to 155-4 that protrude from the column portion 34. The second receiver 156 has four second protrusions 156-1 to 156-4 that protrude from the column portion 34. More specifically, the first protrusion 155-1 and the second protrusion 156-1 protrude from the first column portion 34a. The first protrusion 155-2 and the second protrusion 156-2 protrude from the second column portion 34b. The first protrusion 155-3 and the second protrusion 156-3 protrude from the third column portion 34c. The first protrusion 155-4 and the second protrusion 156-4 protrude from the fourth column portion 34d.

Support Attachment Unit

The support attachment unit 157 is a member used for attaching a tripod or other such support, and has the main body 40 and a support attachment unit upper portion 158. The main body 40 is a cylindrical member, and has a first threaded hole 40a and an exposure face 159. The exposure face 159 is the end face of the support attachment unit 157, and is disposed so that it can be exposed to the outside through the opening part 20. The exposure face 159 is formed around the entrance 40b to the first threaded hole 40a.

The first threaded hole 40a is disposed so that it can be exposed to the outside through the opening part 20, and is arranged so as to allow attachment of the thread (not shown) of the support. More specifically, when no support is attached, the first threaded hole 40a is exposed through the opening 22. The user can insert the thread of the support into the first threaded hole 40a through the opening part 20. The first threaded hole 40a has a center line CL. The direction parallel to the center line CL will hereinafter be referred to as the center line CL direction (an example of a first direction). As shown in FIG. 7B, in this embodiment, the center line CL direction substantially coincides with the Z axis direction.

The thread of the support is inserted into the first threaded hole 40a in the center line CL direction. Since a relatively large force is exerted on the first threaded hole 40a through the thread provided to the support, the support attachment unit 157 needs to have a certain amount of strength. Therefore, the support attachment unit 157 is preferably formed from metal.

Meanwhile, to suppress a rise in the temperature of the support attachment unit 157, the support attachment unit 157 is preferably formed from a metal with a relatively low coefficient of thermal conductivity. An example of a material that satisfies these conditions related to strength and thermal conductivity is a stainless steel alloy.

As shown in FIG. 4, the support attachment unit 157 is disposed on the lower side of the CMOS image sensor 110, and is aligned with the CMOS image sensor 110 in the Z axis direction. If the support attachment unit 157 is disposed in this way, then even if relatively heavy parts (such as the lens unit 200) are disposed near the CMOS image sensor 110, it is less likely that there will be unevenness in the weight distribution around the support attachment unit 157. As a result, the digital camera 1 is more apt to be stable when attached to the support.

The support attachment unit upper portion 158 (an example of a first portion) is disposed on the opposite side of the main body 40 from the exposure face 159, and is able to come into contact with the first receiver 155 and the second receiver 156. The support attachment unit upper portion 158 is formed integrally with the main body 40, for example, and has a flange 158a that protrudes from the main body 40.

As shown in FIG. 7A, part of the support attachment unit upper portion 158 is disposed between the first receiver 155 and the second receiver 156. More specifically, part of the flange 158a is disposed between the first receiver 155 and the second receiver 156. Also, as shown in FIG. 7B, a gap is left in the center line CL direction between the first receiver 155 and the second receiver 156, which ensures enough space for the support attachment unit 157 to move in the center line CL direction. More specifically, a first dimension W1, which is the width of the support attachment unit upper portion 158 in the center line CL direction, is set to be less than a second dimension W2, which is the width in the center line CL direction of the gap between the first receiver 155 and the second receiver 156.

Thus, movement of the support attachment unit 157 in the upward direction (that is, the Z axis positive direction) is limited by the first receiver 155, and movement of the support attachment unit 157 in the downward direction (that is, the Z axis negative direction) is limited by the second receiver 156.

In the following, the position of the support attachment unit 157 when it is in contact with the first receiver 155 will be called the first position. The position of the support attachment unit 157 when it is in contact with the second receiver 156 will be called the second position. FIG. 7A shows the support attachment unit 157 disposed in the first position, while FIG. 7B shows the support attachment unit 157 disposed in the second position.

In the first position, the exposure face 159 is disposed more to the inside of the housing 101 than the outer surface 162. In other words, the exposure face 159 can be said to be disposed more to the first receiver 155 side than the outer surface 162. Also, it can be said that a concave 50 is formed by the opening part 20 and the exposure face 159. In FIG. 7A, the concave 50 is shown by a two-dot chain line.

A first distance D1 in the center line CL direction between the outer surface 162 and the exposure face 159 at the first position (that is, the depth of the concave 50) may be set large enough that it will be unlikely that the user touches the exposure face 159, such as to about 2 or 3 mm.

In the second position, the exposure face 159 and the outer surface 162 are disposed in the same plane. The exposure face 159 does not necessarily have to be planar, and as long as it can hold the support, the exposure face 159 may be something other than planar. For instance, the exposure face 159 may be a curved surface. The phrase "the exposure face 159 and the outer surface 162 are disposed in the same plane" means the relation between the exposure face 159 and the outer surface 162 when the exposure face 159 and the outer surface 162 are touching a common plane. Therefore, even if the exposure face 159 is a curved surface, the exposure face 159 and the outer surface 162 can be said to be disposed in the same plane if the exposure face 159 touches a plane obtained by extending the outer surface 162.

Coil Spring

The coil spring 160 (an example of an elastic member) is an elastic member that elastically links the support attachment unit 157 and the support body unit 10, and is disposed between the housing bottom portion 101a and the support attachment unit upper portion 158.

The coil spring 160 is a compression coil spring, for example, and is fitted to the main body 40. More specifically, as shown in FIG. 7A, a gap is formed between the second receiver 156 and the main body 40, and the coil spring 160 is disposed in this gap. One end of the coil spring 160 is in contact with the support attachment unit upper portion 158, and the other end is in contact with the housing bottom portion 101a.

When no support has been attached to the support attachment unit 157, the coil spring 160 holds the support attachment unit 157 in the first position. More specifically, the coil spring 160 presses the support attachment unit 157 against the first receiver 155, and the support attachment unit upper portion 158 is in contact with the first receiver 155.

When a support has been attached to the support attachment unit 157, the support attachment unit 157 is disposed at the second position. When the support attachment unit 157 moves from the first position to the second position, the support attachment unit upper portion 158 moves to the coil spring 160 side, so the amount of compression of the coil spring 160 increases. Here, the support attachment unit 157 to which the support is attached is pulled toward the support by the thread of the support. Therefore, the support attachment unit 157 will be held at the second position even if subjected to the elastic force of the coil spring 160.

As discussed above, the support attachment unit 157 is supported by the support body unit 10 and the coil spring 160. More specifically, the support attachment unit 157 is supported by the housing bottom portion 101a, the frame bottom portion 154a, and the coil spring 160. The coil spring 160 is disposed in between the support attachment unit upper portion 158 and the housing bottom portion 101a. Also, the support attachment unit upper portion 158 is biased by the spring force of the coil spring 160, and is positioned up and down between the first receiver 155 and the second receiver 156. If no support has been attached, the support attachment unit 157 is pushed up inside the camera body 100 by the biasing force of the coil spring 160, and the support attachment unit upper portion 158 is positioned by coming into contact with the first receiver 155. On the other hand, if a support has been attached, the support attachment unit 157 is pulled out toward the outside of the camera body 100 (the Z axis negative direction) by the tightening force of the thread of the support, and the support attachment unit upper portion 158 is positioned by coming into contact with the second receiver 156.

Any method may be employed to assemble the support attachment unit 157 to the support body unit 10. For example, the column portion 34 and the second receiver 156 can be formed integrally, and the column portion 34 fixed to the plate portion 30. Next, the support attachment unit 157 and the coil spring 160 are disposed between the parts of the column portion 34. Furthermore, the first receiver 155 is fixed to the column portion 34. This allows the support attachment unit 157 to be assembled to the support body unit 10.

In this embodiment, the first receiver 155 has the first protrusions 155-1 to 155-4 protruding from the column portion 34, but the first receiver 155 does not necessarily comprise protrusions. For instance, the first receiver 155 may be formed in a plate shape, and fixed to the column portion 34. Also, a cap may be arranged that functions as the first receiver 155 along with covering the upper part of the column portion 34. That is, a cap that covers the entire column portion 34 may be what limits the upward movement of the support attachment unit 157.

Heat Diffuser

The heat diffuser 198 has a heat diffusing plate 195 and a heat conducting part 196. The heat diffusing plate 195 is disposed between the CMOS image sensor 110 and the main circuit board 142. More specifically, the heat diffusing plate 195 is disposed between the CMOS circuit board 113 and the main circuit board 142. The heat diffusing plate 195 is a rectangular plate-shaped member for diffusing heat generated by the CMOS image sensor 110. A preferable heat diffusion effect can be obtained if aluminum, copper, or another such metal is used as the material of the heat diffusing plate 195.

The heat conducting part 196 is connected to the heat diffusing plate 195 in order to transfer heat to the diaphragm support unit 116. The heat conducting part 196 is connected and fixed to the diaphragm support unit 116. Heat generated from the CMOS image sensor 110 is transferred through the heat diffusing plate 195 and the heat conducting part 196 to the diaphragm support unit 116. To make this heat transfer possible, the heat diffusing plate 195 is disposed at the rear face of the CMOS image sensor 110, and the heat conducting part 196 extends from the heat diffusing plate 195 to the diaphragm support unit 116.

More precisely, the heat conducting part 196 has four plates, which extend forward from the upper and lower ends and the left and right ends of the heat diffusing plate 195. In other words, the heat conducting part 196 is disposed so as to surround the CMOS image sensor 110 from the top, bottom, left, and right. Thus, the CMOS image sensor 110 is surrounded by the heat diffusing plate 195 and the heat conducting part 196 from above, both sides, below, and behind.

The heat conducting part 196 is not necessarily connected to the diaphragm support unit 116, and may be connected to any of the parts disposed between the main frame 154 and the CMOS image sensor 110. The body mount support portion 152 or the shutter unit 190 is possible as an example.

Furthermore, the heat conducting part 196 does not necessarily have to be connected to the diaphragm support unit 116 at four places. For instance, just one of the four plates may connect the heat diffusing plate 195 to the diaphragm support unit 116. However, when stability of the heat diffusing plate 195 is taken into account, connection at three or more places is preferable.

1-3: Configuration of Lens Unit

The lens unit 200 can be mounted to the camera body 100, and forms an optical image of a subject. The lens unit 200 mainly has an optical system L, a driver 215, the lens controller 240, the lens mount 250, an aperture unit 260, and a lens barrel 290.

The optical system L includes a zoom lens group 210 for changing the focal length of the optical system L, an OIS (optical image stabilizer) lens group 220 for suppressing shake of the subject image formed by the optical system L with respect to the CMOS image sensor 110, and a focus lens group 230 for varying the focus state of the subject image that the optical system L forms on the CMOS image sensor 110.

The aperture unit 260 is a light quantity adjusting member that adjusts the quantity of light transmitted by the optical system L. More specifically, the aperture unit 260 has aperture vanes (not shown) that can block part of the light rays transmitted by the optical system L, and an aperture driver (not shown) that drives the aperture vanes.

The driver 215 drives the various lens groups of the optical system L (the zoom lens group 210, the OIS lens group 220, and the focus lens group 230) on the basis of control signals from the lens controller 240. Also, the driver 215 has a detector for detecting the positions of the lens groups of the optical system L.

The lens mount 250 has the lens mount ring 251 (not shown) and the electrical contact 253 (not shown), and can be mechanically and electrically connected to the body mount 150 as discussed above.

The lens controller 240 controls the entire lens unit 200 on the basis of control signals sent from the camera controller 140. The lens controller 240 receives position information about the lens groups of the optical system L as detected by the detector included in the driver 215, and sends this information to the camera controller 140. The camera controller 140 produces control signals for controlling the driver 215 on the basis of the received position information, and sends these signals to the lens controller 240. The lens controller 240 transmits the control signals produced by the camera controller 140 to the driver 215. The driver 215 adjusts the positions of the zoom lens group 210, the OIS lens group 220, and the focus lens group 230 on the basis of these control signals.

Meanwhile, the camera controller 140 produces control signals for operating the aperture unit 260 on the basis of the amount of light received by the CMOS image sensor 110, whether still picture imaging or moving picture imaging is to be performed, whether an aperture value has been preferentially set, or other such information. At this point the lens controller 240 relays the control signals produced by the camera controller 140 to the aperture unit 260.

The lens controller 240 uses a DRAM 241 as a working memory when the aperture unit 260 and the lens groups of the optical system L are to be driven. Also, a flash memory 242 stores programs and parameters used by the lens controller 240.

A lens barrel 290 mainly holds in its interior the optical system L, the lens controller 240, the lens mount 250, and the aperture unit 260. A zoom ring 213, a focus ring 234, and an OIS switch 224 are arranged to the exterior of the lens barrel 290.

The zoom ring 213 is a cylindrical member, and is able to rotate around the outer peripheral face of the lens barrel 290. The zoom ring 213 is an example of a manipulation part for adjusting the focal length. When the zoom ring 213 is turned, the focal length of the optical system L is decided according to the position of the zoom ring 213 after turning. The position of the zoom ring 213 is detected by a detector included in the driver 215, for example.

The focus ring 234 is a cylindrical member, and is able to rotate around the outer peripheral face of the lens barrel 290. The focus ring 234 is an example of a manipulation part for adjusting the focus state of the subject image formed on the CMOS image sensor 110 by the optical system L. When the focus ring 234 is turned, the focus state of the subject image is adjusted according to the position of the focus ring 234 after turning. For example, the lens controller 240 produces control signals on the basis of position information about the focus ring 234, and outputs these to the driver 215. The driver 215 drives the focus lens group 230 on the basis of these control signals.

The OIS switch 224 is an example of a manipulation part for adjusting the OIS. The OIS does not operate when the OIS switch 224 is switched off. The OIS is operable when the OIS switch 224 is switched on.

1-4: Features of Structure

The camera body 100 has no mirror box device, and differs in this respect from a single lens reflex camera. The structural features of the camera body 100 will now be described in further detail through reference to FIGS. 6A and 6B.

FIG. 6A is a simplified cross section of a single lens reflex camera 800, and FIG. 6B is a simplified cross section of the digital camera 1 of this embodiment. In FIG. 6B, the body mount 150, the shutter unit 190, the diaphragm 115, the diaphragm support unit 116, the heat diffusing plate 195, the heat conducting part 196, and other such members are not shown. Also, details of the structure surrounding the support attachment unit 157 are omitted in FIG. 6B.

With the single lens reflex camera 800 shown in FIG. 6A, a mirror box device is disposed on the front face of a CMOS image sensor 810, that is, on the lens unit 802 side of the CMOS image sensor 810. The mirror box device includes a reflecting mirror 803 and a pentaprism 804. A CMOS circuit board 813 and a main circuit board 842 (which includes a camera controller 840) are disposed in that order, starting from the front, on the rear face of the CMOS image sensor 810 (that is, on the opposite side from the lens unit 802 with respect to the CMOS image sensor 810). Also, a metal main frame 854 is disposed along the bottom face from the front face in the interior of a camera body 801 in order to ensure the strength of the camera body 801. Further, a support attachment unit 857 is arranged to the bottom face of the camera body 801, and the support attachment unit 857 is fixed to the main frame 854.

With the single lens reflex camera 800, an optical image of a subject formed by the lens unit 802 is guided to the CMOS image sensor 810 or an optical viewfinder 805 by the pentaprism 804 and the reflecting mirror 803 included in the mirror box device. Thus, space for disposing the movable reflecting mirror 803 and pentaprism 804, and space for the optical path from the reflecting mirror 803 to the optical viewfinder 805 need to be reserved in the interior of the camera body 801, so the camera body 801 is not suited to a reduction in size.

On the other hand, because there is a large space in the interior of the camera body 801, because the surface area of the camera body 801 is large, and for other such reasons, heat generated from the CMOS image sensor 810 is readily diffused with the single lens reflex camera 800. Also, since the support attachment unit 857 can be disposed at a position that is away from the CMOS image sensor 810, heat generated from the CMOS image sensor 810 is less likely to be transferred to the support attachment unit 857.

In contrast, as shown in FIG. 6B, with the digital camera 1 according to this embodiment, since no mirror box device is disposed on the front side of the CMOS image sensor 110, the flange back can be shortened, and the camera body 100 can be more compact. Furthermore, since the flange back is short, this affords greater latitude in the design of the optical system L, and allows the lens unit 200 to be more compact. Therefore, omitting the mirror box device allows the digital camera 1 to be made smaller.

However, although the camera body 100 can be made smaller since there is no need for space in which to arrange a mirror box device as with the single lens reflex camera 800, the parts are disposed closer together with the digital camera 1, so the distance between the CMOS image sensor 110 and the support attachment unit 157 is shorter than with the single lens reflex camera 800.

Furthermore, the power consumption of the CMOS image sensor 110 and the camera controller 140 rises when the picture quality is increased and moving picture imaging is involved, and the CMOS image sensor 110 and the camera controller 140 also generate more heat.

For example, with the digital camera 1, the CMOS image sensor 110 is also able to handle the capture of high-resolution moving pictures, so the power consumption is roughly three times (from 0.4 W to 1.2 W) higher than with a CMOS image sensor that is not compatible with the capture of high-resolution moving pictures (such as the CMOS image sensor 810 of the single lens reflex camera 800). As a result, the amount of heat generated by the CMOS image sensor 110 is greater than that of a CMOS image sensor that is not compatible with the capture of high-resolution moving pictures.

Thus, with the digital camera 1, there is an increase in the heat generation from electronic parts such as the CMOS image sensor 110 or the camera controller 140 as compared to the single lens reflex camera 800, and furthermore as the size decreases, the support attachment unit 157 is disposed closer to the CMOS image sensor 110, so heat generated by the CMOS image sensor 110 is more readily transferred to the support attachment unit 157. When this happens, it can cause discomfort when the user touches the support attachment unit 157 and senses a difference between the temperature of the support attachment unit 157 and the surrounding temperature.

1-5: Attachment and Removal of Support

In view of this, with the digital camera 1 according to this embodiment, the support attachment unit 157 is disposed at a position that is less likely to be touched by the user. More specifically, when no support has been attached to the support attachment unit 157, the support attachment unit 157 is disposed in the interior of the camera body 100. As a result, the exposure face 159 is disposed at a position that is unlikely to be touched by the user.

The structure of the support attachment unit 157 will now be described in more specific terms. FIGS. 7A to 7C are simplified diagrams illustrating the structure around the support attachment unit 157. FIG. 7A is a cross section of the support attachment unit 157 and the support body unit 10 when a support has not been attached, FIG. 7B is a cross section of the support attachment unit 157 and the support body unit 10 when a support has been attached, and FIG. 7C is an oblique view of near the support attachment unit 157. The support is not shown in FIG. 7B. The coil spring 160 is not shown in FIG. 7C.

As discussed above, with the digital camera 1 according to this embodiment, the support attachment unit 157 is able to move between a first position and a second position. When the support attachment unit 157 is disposed at the first position, the exposure face 159 formed around the entrance 40b to the first threaded hole 40a is disposed more to the first receiver 155 side than the outer surface 162 of the housing 101. When the support attachment unit 157 is disposed at the second position, the exposure face 159 where the entrance 40b of the first threaded hole 40a is formed is disposed in the same plane as the outer surface 162 of the housing 101.

If no support has been attached to the support attachment unit 157, the support attachment unit 157 is held in the first position by the coil spring 160. More specifically, the coil spring 160 is disposed between the support attachment unit upper portion 158 and the housing bottom portion 101a. If the user is not using a support, the support attachment unit 157 is biased and pushed up by the coil spring 160 in the interior of the camera body 100 to the position where the support attachment unit upper portion 158 hits the first receiver 155. As discussed above, the position of the support attachment unit 157 at this point is the first position (the position of the support attachment unit 157 shown in FIG. 7A).

Here, since the support attachment unit 157 is disposed on the lower side of the CMOS image sensor 110, any radiant heat or convection heat from the CMOS image sensor 110 tends to be transferred to the support attachment unit 157. Therefore, it can be said that the temperature of the support attachment unit 157 is apt to rise with the digital camera 1. However, since the support attachment unit 157 is pushed up inside the camera body 100 by the coil spring 160, it is unlikely that the user will touch the exposure face 159. As a result, this reduces the likelihood that the user will experience discomfort by touching the exposure face 159.

When the user is using a support, on the other hand, the user screws the thread of the support into the support attachment unit 157. When the user turns the thread of the support with respect to the support attachment unit 157, the thread of the support is screwed into the first threaded hole 40a.

Here, since the support attachment unit 157 is pressed against the first receiver 155 by the coil spring 160, when the support attachment unit 157 turns with respect to the first receiver 155, a frictional force is generated between the support attachment unit 157 and the first receiver 155. Since the friction generated between the support attachment unit 157 and the first receiver 155 suppresses rotation of the support attachment unit 157, the thread of the support can be turned with respect to the support attachment unit 157. A structure may also be arranged for suppressing the rotation of the support attachment unit 157. For example, anti-rotation protrusions may be formed on the outer peripheral face of the main body 40, and grooves for guiding these protrusions in the center line CL direction may be formed on the inner peripheral face of the opening 22.

When the thread of the support is screwed into the first threaded hole 40a, the support comes into contact with the outer surface 162. When the thread of the support is screwed farther into the first threaded hole 40a, the support attachment unit 157 moves closer to the support. Thus, the opening part 20 and the support attachment unit 157 are fastened together by the thread of the support, and the coil spring 160 is compressed. The support attachment unit 157 moves to the outside of the camera body 100 (that is, away from the first receiver 155) up to the position where the support attachment unit upper portion 158 hits the second receiver 156.

When the support attachment unit upper portion 158 has come into contact with the second receiver 156, the exposure face 159 lines up with the outer surface 162. That is, the exposure face 159 and the outer surface 162 are disposed in the same plane. As discussed above, the position of the support attachment unit 157 at this point is the second position (the position of the support attachment unit 157 shown in FIG. 7B).

In this embodiment, the first distance D1 is substantially equal to the difference between the second dimension W2 and the first dimension W1. Since this dimensional relation is satisfied, when the support attachment unit 157 is disposed at the second position, the exposure face 159 and the outer surface 162 are disposed in the same plane.

When a support has been mounted to the camera body 100, since the exposure face 159 lines up with the outer surface 162, the support can hold up the camera body 100 via the support attachment unit 157 and the outer surface 162. Therefore, excessive force from the support can be prevented from being exerted on the support attachment unit 157 or the housing 101 of the camera body 100.

In regard to the camera body to which the support is attached here, if the exposure face 159 does not line up with the outer surface 162, care must be taken in the handling of the camera body. As an example, a camera body is conceivable in which the exposure face 159 is disposed more to the inside of the camera body than the outer surface 162 when a support is attached. With a camera body such as this, a gap is formed between the exposure face 159 and the support. That is, since the exposure face 159 does not come into contact with the support, it is possible that a large force will be exerted on the thread of the support, causing the thread of the support to be screwed farther into the first threaded hole 40a. Therefore, when the user exerts a strong force on the thread of the support, it is possible that an excessive, vertically downward pulling force will continue to be exerted on the support attachment unit 157, causing strain in the housing bottom portion 101a that holds the support attachment unit 157.

As another example, a camera body is conceivable in which the exposure face 159 is pushed far out from the outer surface 162 when a support is attached. With a camera body such as this, the exposure face 159 comes into contact with the support, but the outer surface 162 does not. Therefore, the support attachment unit 157 is the only point at which the camera body is held by the support, and it is possible that an excessive load will be exerted on the support attachment unit 157. As a result, it is possible that the support attachment unit 157 or the support body unit 10 may be damaged.

Meanwhile, with the camera body 100 according to this embodiment, when a support is attached, the exposure face 159 is pushed out until it lines up with the outer surface 162. In other words, the coil spring 160, the first receiver 155, and the second receiver 156 are disposed so that the exposure face 159 and the outer surface 162 line up when a support is attached to the support attachment unit 157.

As shown in FIG. 7C, in this embodiment the first receiver 155 has the four first protrusions 155-1 to 155-4, but the first receiver 155 does not necessarily have to have all four of these first protrusions 155-1 to 155-4. As long as the first receiver 155 can limit movement of the support attachment unit 157, it may have just one of the first protrusions 155-1 to 155-4.

Similarly, the second receiver 156 has the four second protrusions 156-1 to 156-4, but the second receiver 156 does not necessarily have to have all four of these second protrusions 156-1 to 156-4. As long as the second receiver 156 can limit movement of the support attachment unit 157, it may have just one of the second protrusions 156-1 to 156-4.

In this embodiment, the first receiver 155 and the second receiver 156 are arranged to the main frame 154. Since the main frame 154 is a member formed from metal, the necessary strength of the first receiver 155 and the second receiver 156 is ensured.

In particular, if the housing 101 is formed from a material that is not as strong as the main frame 154 (such as a synthetic resin), arranging the first receiver 155 or the second receiver 156 to the main frame 154 can increase the strength of the first receiver 155 and the second receiver 156.

Also, in this embodiment both the first receiver 155 and the second receiver 156 were arranged to the main frame 154, but it is also possible to form just the second receiver 156 on the main frame 154, for example.

1-6: Effects

The effects of the camera body 100 according to this embodiment will now be compiled.

(1)

With this camera body 100, since the exposure face 159 is disposed more to the inside of the housing 101 than the outer surface 162 when no support has been attached to the support attachment unit 157, the support attachment unit 157 can be disposed at a position the user is unlikely to touch. Therefore, this reduces the frequency at which the user will touch the support attachment unit 157 and feel a difference between the temperature of the support attachment unit 157 and the surrounding temperature.

Meanwhile, the support attachment unit 157 is movably supported by the support body unit 10, and when the support is attached to the support attachment unit 157, the exposure face 159 and the outer surface 162 are disposed within the same plane, so the support attachment unit 157 can be disposed closer to the support.

Thus, it is less likely that the user will experience discomfort, and the support attachment unit 157 can be disposed at a position suited to the attachment of the support.

(2)

With this camera body 100, since the support attachment unit moves from the second position to the first position in conjunction with the operation of removing the support attachment unit 157, no extra operation is required on the part of the user, and the support attachment unit 157 can be moved to a position that is unlikely to be touched by the user.

More specifically, the support attachment unit 157 is elastically linked to the support body unit 10 by the coil spring 160, and is pressed against the first receiver 155 when no support has been attached. Therefore, when no support has been attached, the support attachment unit 157 is held at the first position by the coil spring 160. When a support is removed from the support attachment unit 157, the support attachment unit 157 is automatically moved to the first position by the coil spring 160, so an extra operation by the user can be omitted.

(3)

With this camera body 100, since the exposure face 159 is in contact with the support when the support attachment unit 157 is disposed at the second position, the camera body 100 is held up by the support via the support attachment unit 157. Thus, the support attachment unit 157 functions as the support point, so the camera body 100 is less likely to be subjected to load than when the support attachment unit 157 cannot be in contact with the support.

(4)

With this camera body 100, movement of the support attachment unit 157 is limited by the first receiver 155 and the second receiver 156. More specifically, part of the support attachment unit upper portion 158 is disposed between the first receiver 155 and the second receiver 156, the support attachment unit upper portion 158 comes into contact with the first receiver 155 at the first position, and the support attachment unit upper portion 158 comes into contact with the second receiver 156 at the second position. Thus, a simple configuration can be used while allowing the support attachment unit 157 to be disposed accurately in the first and second positions.

(5)

With this camera body 100, since the first receiver 155 and the second receiver 156 are formed on the main frame 154, the necessary strength of the first receiver 155 and the second receiver 156 can be ensured.

Second Embodiment

Next, a second embodiment will be described. In the first embodiment above, the support body unit 10 included the main frame 154, but it is also possible to omit the main frame 154 from the support body unit 10.

Figure 8A:
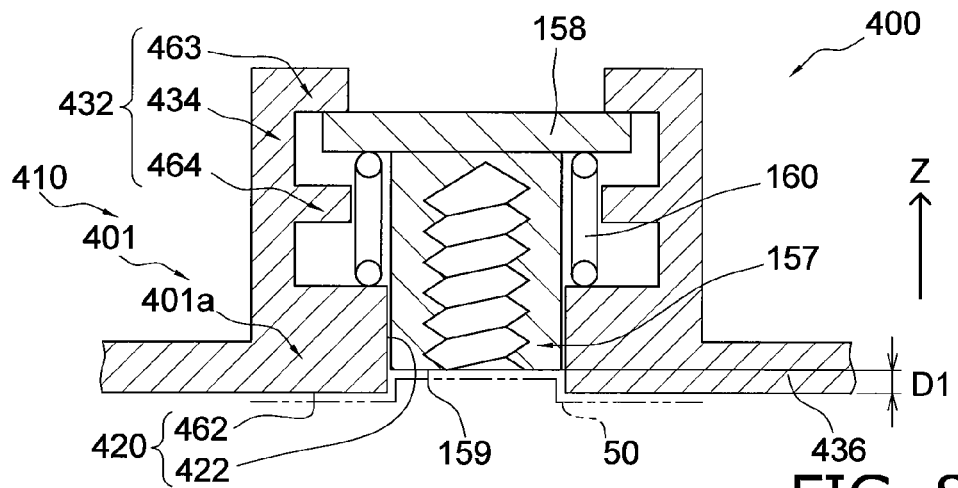
FIG. 8A is a cross section of the support attachment unit 157 and a support body unit 410 when the support has not been attached.
Figure 8B:
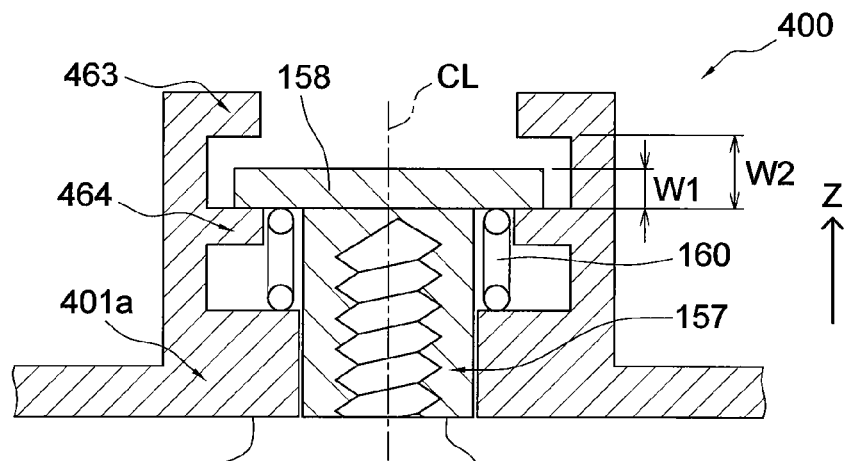
FIG. 8B is a cross section of the support attachment unit 157 and the support body unit 410 when the support has been attached.
Figure 8C:
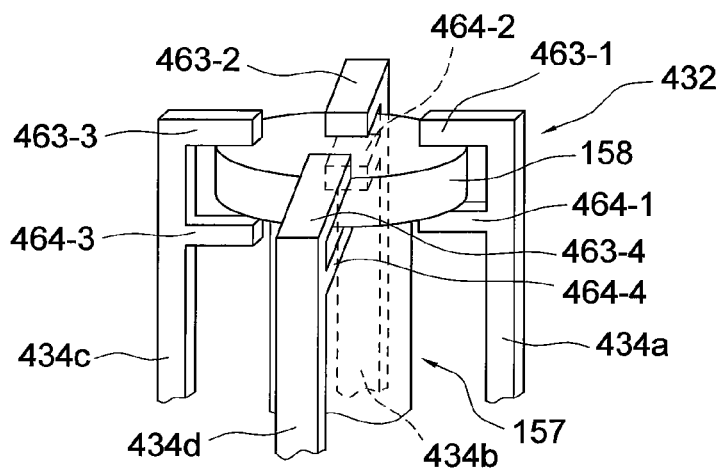
FIG. 8C is an oblique view of the support attachment unit 157 and a positioning portion 432.

With the camera body 400 according to the second embodiment, as contrasted with the camera body 100 of the first embodiment, no frame bottom portion 154a is used, and the housing bottom portion 101a has a different structure. Thus, the description here will focus on the housing bottom portion 101a and the support attachment unit 157, and description of portions the two embodiments have in common will be omitted. FIGS. 8A to 8C are simplified diagrams illustrating the structure of a support body unit 410 according to the second embodiment. FIG. 8A is a cross section of the support attachment unit 157 and the support body unit 410 when a support has not been attached, FIG. 8B is a cross section of the support attachment unit 157 and the support body unit 410 when a support has been attached, and FIG. 8C is an oblique view of the support attachment unit 157. The support is not shown in FIG. 8B. Also, the coil spring 160 is not shown in FIG. 8C.

2-1: Configuration

With the camera body 400 according to the second embodiment, movement of the support attachment unit upper portion 158 in the up and down direction is not limited by the main frame 154, and instead movement in the up and down direction is limited by a first receiver 463 and a second receiver 464 formed on a housing 401.

The support body unit 410 is a unit that movably supports the support attachment unit 157, and has the housing 401.

The housing 401 has a housing bottom portion 401a. The housing bottom portion 401a has a base portion 436 and a positioning portion 432.

The base portion 436 is a substantially flat member that forms the bottom face of the camera body 100. An opening part 420 is formed in the base portion 436. The opening part 420 has an opening 422 (an example of an opening) formed in the base portion 436, and an outer surface 462. The support attachment unit 157 is exposed through the opening 422. The support attachment unit 157 is slidably inserted into the opening 422. The opening 422 passes through in the center line CL direction, and guides the support attachment unit 157 in the center line CL direction when the support attachment unit 157 moves. The outer surface 462 is a substantially flat face formed around the opening 422, and is exposed to the outside.

The positioning portion 432 is a portion for limiting the movement of the support attachment unit 157, and has a column portion 434, the first receiver 463, and the second receiver 464.

The column portion 434 protrudes to the inside from the base portion 436, and comprise a first column portion 434a, a second column portion 434b, a third column portion 434c, and a fourth column portion 434d. The first to fourth column portions 434a to 434d are disposed around the opening part 420.

The first to fourth column portions 434a to 434d surround the support attachment unit 157. More specifically, the first column portion 434a and the third column portion 434c face each other with the support attachment unit 157 in between. Also, the second column portion 434b and the fourth column portion 434d face each other with the support attachment unit 157 in between.

The first receiver 463 is fixed to the end of the column portion 434 on the opposite side from the outer surface 462, and limits movement of the support attachment unit 157.

The second receiver 464 is disposed between the first receiver 463 and the outer surface 462, and limits movement of the support attachment unit 157. The second receiver 464 is formed integrally with the column portion 434, for example.

The first receiver 463 has four first protrusions 463-1 to 463-4 that protrude from the column portion 434. The second receiver 464 has four second protrusions 464-1 to 464-4 that protrude from the column portion 434. More specifically, the first protrusion 463-1 and the second protrusion 464-1 protrude from the first column portion 434a. The first protrusion 463-2 and the second protrusion 464-2 protrude from the second column portion 434b. The first protrusion 463-3 and the second protrusion 464-3 protrude from the third column portion 434c. The first protrusion 463-4 and the second protrusion 464-4 protrude from the fourth column portion 434d.

As shown in FIG. 8A, part of the support attachment unit upper portion 158 is disposed between the first receiver 463 and the second receiver 464. More specifically, part of the flange 158a is disposed between the first receiver 463 and the second receiver 464. Also, a gap is left in the center line CL direction between the first receiver 463 and the second receiver 464, which ensures enough space for the support attachment unit 157 to move in the center line CL direction. More specifically, a first dimension W1, which is the width of the support attachment unit upper portion 158 in the center line CL direction, is set to be less than a second dimension W2, which is the width in the center line CL direction of the gap between the first receiver 463 and the second receiver 464.

Thus, movement of the support attachment unit 157 in the upward direction (that is, the Z axis positive direction) is limited by the first receiver 463, and movement of the support attachment unit 157 in the downward direction (that is, the Z axis negative direction) is limited by the second receiver 464.

In the following, the position of the support attachment unit 157 when it is in contact with the first receiver 463 will be called the first position. The position of the support attachment unit 157 when it is in contact with the second receiver 464 will be called the second position. FIG. 8A shows the support attachment unit 157 disposed in the first position, while FIG. 8B shows the support attachment unit 157 disposed in the second position.

In the first position, the exposure face 159 is disposed more to the inside of the housing 401 than the outer surface 462. In other words, the exposure face 159 can be said to be disposed more to the first receiver 463 side than the outer surface 462. Also, it can be said that a concave 50 is formed by the opening part 420 and the exposure face 159. In FIG. 8A, the concave 50 is shown by a two-dot chain line. In the second position, the exposure face 159 and the outer surface 462 are disposed in the same plane.

Any method may be employed to assemble the support attachment unit 157 to the support body unit 410. For example, the housing bottom portion 401a may be formed by combining a pair of members. In this case, for example, the first column portion 434a and the fourth column portion 434d are formed integrally with one of the pair of members, and the second column portion 434b and the third column portion 434c are formed integrally with the other member. The support attachment unit 157 and the coil spring 160 are disposed between the parts of the column portion 434. The support attachment unit 157 can be assembled to the support body unit 410 in this manner.

2-2: Operation

When no support has been attached to the support attachment unit 157, the support attachment unit 157 is biased by the coil spring 160 disposed between the support attachment unit upper portion 158 and the housing bottom portion 401a, and pushed up into the interior of the camera body 400. More specifically, the support attachment unit 157 is pushed up to the position where the support attachment unit upper portion 158 hits the first receiver 463. As discussed above, the position of the support attachment unit 157 at this point is the first position (the position of the support attachment unit 157 shown in FIG. 8A).

Just as with the camera body 100 according to the first embodiment, any radiant heat or convection heat from the CMOS image sensor 110 is readily transferred to the support attachment unit 157, so there is a tendency for the temperature of the support attachment unit 157 to rise. However, since the support attachment unit 157 is pushed up inside the camera body 400, it is unlikely that the user will touch the exposure face 159. As a result, this reduces the likelihood that the user will experience discomfort by touching the exposure face 159.

When a support is attached to the support attachment unit 157, on the other hand, the opening part 420 and the support attachment unit 157 are fastened together by the thread of the support, and the coil spring 160 is compressed. The support attachment unit 157 moves to the outside of the camera body 400 (that is, away from the first receiver 463) up to the position where the support attachment unit upper portion 158 hits the second receiver 464.

When the support attachment unit upper portion 158 has come into contact with the second receiver 464, the exposure face 159 lines up with the outer surface 462. That is, the exposure face 159 and the outer surface 462 are disposed in the same plane. As discussed above, the position of the support attachment unit 157 at this point is the second position (the position of the support attachment unit 157 shown in FIG. 8B).

When a support has been mounted to the camera body 400, since the exposure face 159 lines up with the outer surface 462, the support can hold up the camera body 400 via the support attachment unit 157 and the outer surface 462. Therefore, excessive force from the support can be prevented from being exerted on the support attachment unit 157 or the camera body 400.

In regard to the camera body to which the support is attached here, if the exposure face 159 does not line up with the outer surface 462, care must be taken in the handling of the camera body. As an example, a camera body is conceivable in which the exposure face 159 is disposed more to the inside of the camera body than the outer surface 462 when a support is attached. With a camera body such as this, when the user exerts a strong force on the thread of the support, it is possible that an excessive, vertically downward pulling force will continue to be exerted on the support attachment unit 157, causing strain in the housing bottom portion 401a.

As another example, a camera body is conceivable in which the exposure face 159 is pushed far out from the outer surface 462 when a support is attached. With a camera body such as this, the support attachment unit 157 is the only point at which the camera body is held by the support, and it is possible that an excessive load will be exerted on the support attachment unit 157.

Meanwhile, with the camera body 400, when a support is attached, the exposure face 159 is pushed out until it lines up with the outer surface 462. In other words, the coil spring 160, the first receiver 463, and the second receiver 464 are disposed so that the exposure face 159 and the outer surface 462 line up when a support is attached to the support attachment unit 157.

As shown in FIG. 8C, in this embodiment the first receiver 463 has the four first protrusions 463-1 to 463-4, but does not necessarily have to have four of these. The first receiver 463 may comprise one or more protrusions. Similarly, the second receiver 464 has the four second protrusions 464-1 to 464-4, but does not necessarily have to have four of these. The second receiver 464 may comprise one or more protrusions.

Third Embodiment

In the above embodiments, the coil spring 160 was arranged for holding the support attachment unit 157 in the first position, but it is also possible to omit a member for holding the support attachment unit 157 in the first position.

A camera body 500 (an example of an imaging device) according to a third embodiment will now be described through reference to FIGS. 9A to 10C. Only those portions that differ from the first embodiment will be described. Also, parts having substantially the same function as in the first embodiment will be numbered the same, and will not be described again in detail.

3-1: Configuration

Figure 9A:
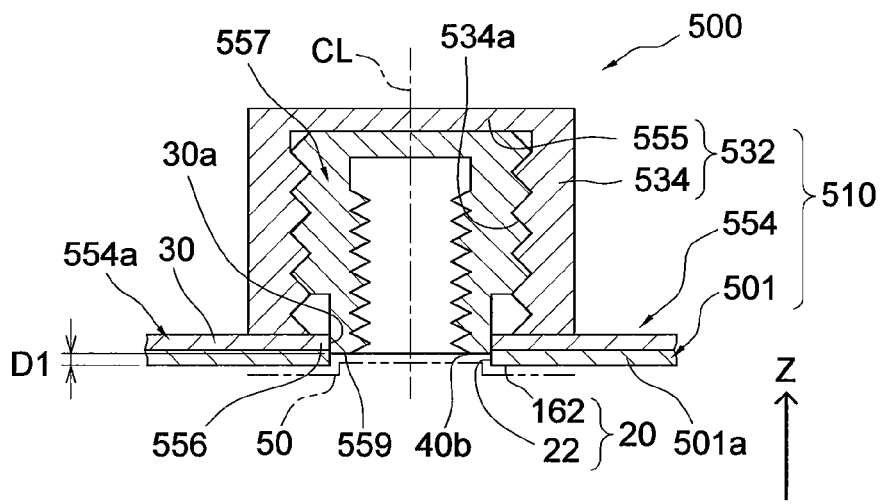
FIG. 9A is a cross section of a support attachment unit 557 and a support body unit 510 when the support has not been attached.
Figure 9B:
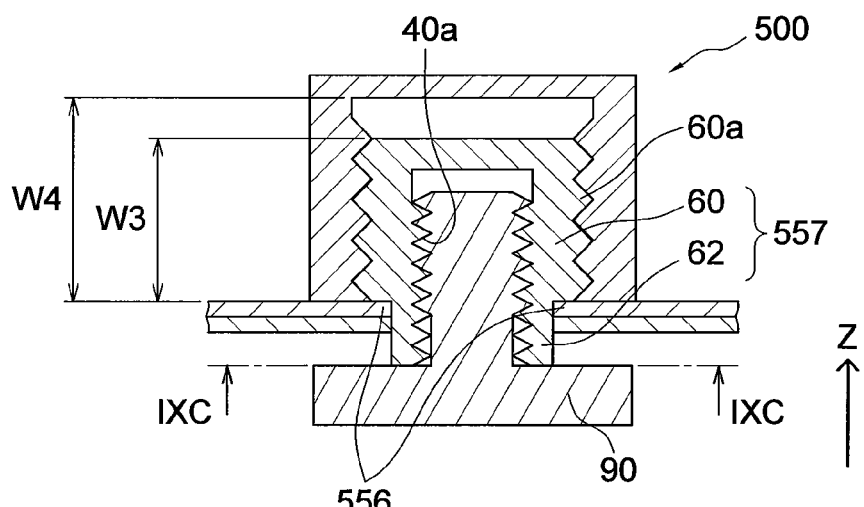
FIG. 9B is a cross section of the support attachment unit 557 and the support body unit 510 when the support has been attached.

The camera body 500 according to the third embodiment has a support attachment unit 557 and a support body unit 510. As shown in FIGS. 9A and 9B, the support body unit 510 has a housing 501, a main frame 554, and a holder portion 532.

The housing 501 has a housing bottom portion 501a. An opening part 20 is formed in the housing bottom portion 501a.

The main frame 554 (an example of a frame) is a member that ensures the necessary strength in the camera body 500, and has a frame front portion 154b and a frame bottom portion 554a. The frame bottom portion 554a has a plate portion 30 and a through-hole 30a. A second receiver 556 for limiting the movement of the support attachment unit 557 is formed around the through-hole 30a. If no support has been attached to the support attachment unit 557, the support attachment unit 557 is exposed to the outside via the through-hole 30a and the opening 22.

The holder portion 532 is a member that movably supports the support attachment unit 557, and has a trunk part 534 and a first receiver 555.

The trunk part 534 is fixed to the frame bottom portion 554a, and accommodates the support attachment unit 557. A second threaded hole 534a for mounting the support attachment unit 557 is formed in the trunk part 534. The second threaded hole 534a is formed to be compatible with a left-hand thread. That is, a left-hand thread can be screwed into the second threaded hole 534a by turning the left-hand thread counter-clockwise as viewed from the left-hand thread. In this embodiment, the second threaded hole 534a is formed so that the left-hand thread will advance in the Z axis positive direction when screwed into the second threaded hole 534a.

The entrance side of the second threaded hole 534a is fixed to the frame bottom portion 554a. Also, the entrance to the second threaded hole 534a is disposed at a position that overlaps the through-hole 30a and the opening 22. Further, part of the entrance to the second threaded hole 534a is covered by the frame bottom portion 554a. The portion of the plate portion 30 that sticks out to the entrance of the second threaded hole 534a forms the second receiver 556. Therefore, the through-hole 30a can be said to be a hole formed in the second receiver 556.

The first receiver 555 is disposed on the opposite side of the trunk part 534 from the frame bottom portion 554a, and limits movement of the support attachment unit 557 with respect to the support body unit 510. The opposite side of the second threaded hole 534a from the frame bottom portion 554a is covered by the first receiver 555. Movement of the support attachment unit 557 is to be limited by the first receiver 555, so at least part of the opposite side of the second threaded hole 534a from the frame bottom portion 554a is to be covered. The first receiver 555 is formed integrally with the trunk part 534 by arranging the second threaded hole 534a to the trunk part 534, for example.

The support attachment unit 557 is a member to which a support can be attached, and has a large diameter part 60 and a small diameter part 62. The support attachment unit 557 is movably supported by the support body unit 510.

The first threaded hole 40a is formed in the support attachment unit 557. The first threaded hole 40a is disposed so that it can be exposed to the outside through the opening part 20, and is arranged so that a support thread 90 can be attached. The first threaded hole 40a has a center line CL. In this embodiment, the center line CL direction substantially coincides with the Z axis direction. The first threaded hole 40a is formed to be compatible with a right-hand thread. Therefore, a right-hand thread can be screwed into the first threaded hole 40a by turning the right-hand thread clockwise as viewed from the right-hand thread. The first threaded hole 40a is disposed substantially coaxially with the second threaded hole 534a.

The large diameter part 60 (an example of a first portion) is a cylindrical portion, and has a threaded part 60a. The threaded part 60a has a plurality of threads formed on the outer peripheral part of the large diameter part 60, and is formed so as to fit together with the second threaded hole 534a. The threaded part 60a comprises a left-hand thread (that is, a reverse thread). Therefore, the large diameter part 60 can be fitted together with the second threaded hole 534a by turning the large diameter part 60 counter-clockwise as viewed from the large diameter part 60.

The large diameter part 60 is movably supported by the holder portion 532. More specifically, the large diameter part 60 is fitted into the second threaded hole 534a. Since part of the large diameter part 60 is disposed between the first receiver 555 and the second receiver 556, movement of the large diameter part 60 is limited by the first receiver 555 and the second receiver 556. Here, a first dimension W3 of the large diameter part 60 in the center line CL direction is set to be smaller than a second dimension W4 of the second threaded hole 534a in the center line CL direction, so that the large diameter part 60 can move.

The small diameter part 62 is a cylindrical portion, and protrudes from the large diameter part 60. The small diameter part 62 is formed coaxially with the large diameter part 60, and the diameter of the small diameter part 62 is set to be smaller than the diameter of the large diameter part 60. The small diameter part 62 is able to rotate integrally with the large diameter part 60, and is formed integrally with the large diameter part 60, for example. The small diameter part 62 has the entrance 40b to the first threaded hole 40a, and an exposure face 559 formed around the entrance 40b. When no support has been attached to the support attachment unit 557, the exposure face 559 is exposed to the outside through the opening 22 and the through-hole 30a. When a support has been attached to the support attachment unit 557, the exposure face 559 is in contact with the support.

Since the through-hole 30a and the opening 22 are formed larger than the small diameter part 62, the small diameter part 62 can move into the through-hole 30a and the opening 22. In this embodiment the small diameter part 62 is formed in a cylindrical shape, but as long as the support attachment unit 557 capable of relative movement with respect to the support body unit 510, the small diameter part 62 may have some shape other than cylindrical. For example, if the through-hole 30a and the opening 22 are formed large enough that the support attachment unit 557 can rotate relative to the support body unit 510, it is also possible for the small diameter part 62 to be formed in a prismatic shape.

Any method may be employed to assemble the support attachment unit 557 to the support body unit 510. For example, the support attachment unit 557 can be assembled to the support body unit 510 by inserting the support attachment unit 557 into the holder portion 532, and fixing the holder portion 532 to the frame bottom portion 554a. Also, the second receiver 556 may be separate from the plate portion 30. In this case, the holder portion 532 is formed integrally with the plate portion 30, and the second receiver 556 can be fixed to the plate portion 30 after the support attachment unit 557 has been mounted to the holder portion 532.

As discussed above, the support attachment unit 557 is movably supported by the support body unit 510. Also, the range of movement of the support attachment unit 557 is limited by the first receiver 555 and the second receiver 556. More specifically, the support attachment unit 557 can be disposed at a first position and a second position. FIG. 9A shows the support attachment unit 557 disposed at the first position, and FIG. 9B shows the support attachment unit 557 disposed at the second position.

When the support attachment unit 557 is disposed at the first position, movement of the support attachment unit 557 is limited by the first receiver 555. And when the support attachment unit 557 is disposed at the second position, movement of the support attachment unit 557 is limited by the second receiver 556. More precisely, when the support attachment unit 557 is disposed at the first position, the large diameter part 60 is touching the first receiver 555. And when the support attachment unit 557 is disposed at the second position, the large diameter part 60 is touching the second receiver 556. Thus, upward movement of the support attachment unit 557 is limited by the first receiver 555, and downward movement of the support attachment unit 557 is limited by the second receiver 556.

When the support attachment unit 557 is disposed at the first position, the exposure face 559 is disposed more to the inside of the housing 501 than the outer surface 162. In other words, it can be said that the exposure face 559 is disposed on the first receiver 555 side of the outer surface 162. It can also be said that the concave 50 is formed by the opening part 20 and the exposure face 559.

In this embodiment, the first distance D1 in the center line CL direction between the outer surface 162 and the exposure face 559 at the first position is less than the difference between the second dimension W4 and the first dimension W3. Since this dimensional relation is satisfied, if the support attachment unit 557 is disposed at the second position, part of the support attachment unit 557 protrudes from the outer surface 162. Also, as shown in FIG. 9B, the support thread 90 can be brought into contact with the outer surface 162.

The support attachment unit 557 is disposed integrally rotatably with the support with respect to the support body unit 510. In this embodiment, the pitch of the female thread formed around the second threaded hole 534a is greater than the pitch of the female thread formed around the first threaded hole 40a. Therefore, the frictional force between the second threaded hole 534a and the threaded part 60a can be made smaller than the frictional force between the first threaded hole 40a and the support thread 90. That is, the frictional force can be adjusted by providing a difference in the size of the thread pitches, and adjusting the contact surface area between the second threaded hole 534a and the threaded part 60a, and the contact surface area between the first threaded hole 40a and the support thread 90. Since the support attachment unit 557 thus turns more easily than the support thread 90, the support attachment unit 557 can be rotated integrally with the support thread 90 (that is, the support) with respect to the support body unit 510.

Also, in this embodiment, when the user inserts the support thread 90 into the support attachment unit 557 disposed at the first position, rotation of the support attachment unit 557 with respect to the holder portion 532 begins before the support touches the outer surface 162. When the user removes the support thread 90 from the support attachment unit 557 disposed at the second position, rotation of the support attachment unit 557 with respect to the holder portion 532 begins before the support thread 90 is completely separated from the first threaded hole 40a.

3-2: Operation

The operation of attaching a support to the support attachment unit 557, and the operation of removing the support from the support attachment unit 557 will now be described.

Attachment

As shown in FIG. 9A, when no support is attached to the support attachment unit 557, the support attachment unit 557 is disposed at the first position. The user inserts the support thread 90 into the first threaded hole 40a in order to attach the support to the support attachment unit 557.

Figure 9C:
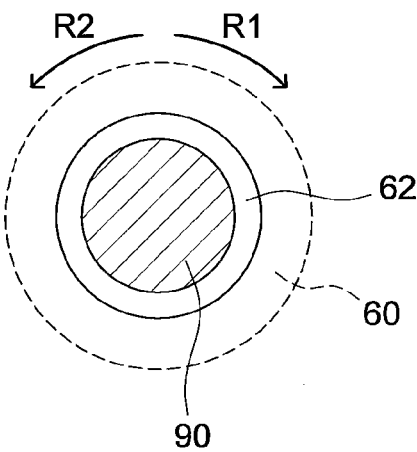
FIG. 9C is an IXC-IXC cross section in FIG. 9B.
Figure 10A:
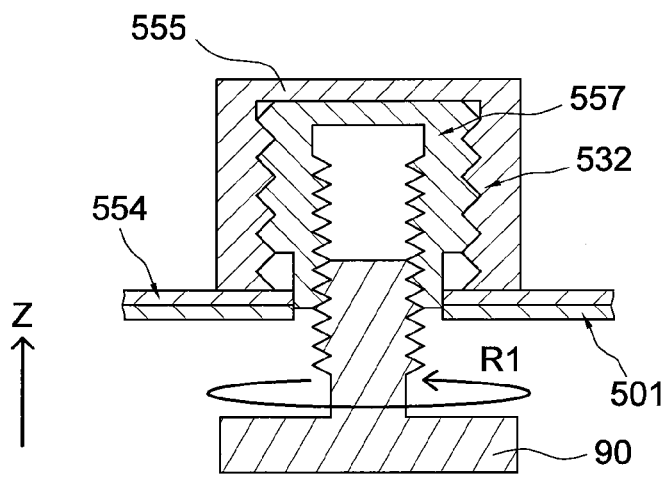
FIG. 10A is a diagram illustrating the attachment of a support to the support attachment unit 557.

When the user turns the support thread 90 in the R1 direction in FIG. 9C, part of the support thread 90 moves into the first threaded hole 40a. Since friction is generated between the support thread 90 and the first threaded hole 40a at this point, a drive force is transmitted in the R1 direction from the support thread 90 to the support attachment unit 557. Also, as discussed above, the frictional force is set relatively low between the second threaded hole 534a and the threaded part 60a. Therefore, once the support thread 90 moves a certain amount into the first threaded hole 40a, the support attachment unit 557 begins to rotate in the R1 direction (FIG. 10A).

Figure 10B:
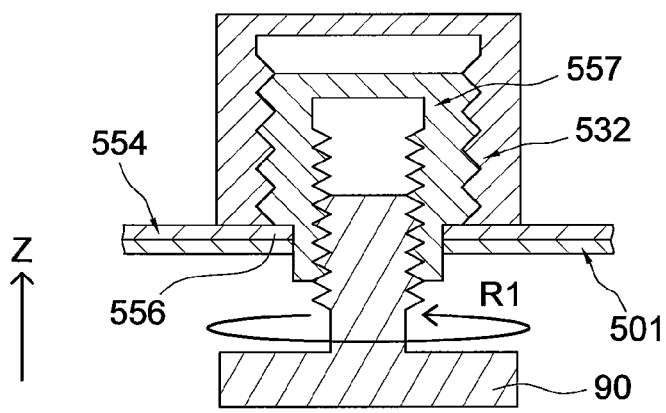
FIG. 10B is a diagram illustrating the attachment of the support to the support attachment unit 557.

Since a left-hand thread is formed in the threaded part 60a, when the support attachment unit 557 turns in the R1 direction, the large diameter part 60 is guided by the second threaded hole 534a and moves in the Z axis negative direction (that is, to the second receiver 556 side). As shown in FIG. 10B, once the support attachment unit 557 rotates a certain amount in the R1 direction, the large diameter part 60 comes into contact with the second receiver 556. As a result, movement of the support attachment unit 557 is limited by the second receiver 556, and the support attachment unit 557 is stationary with respect to the second receiver 556. At this point the support attachment unit 557 is disposed at the second position shown in FIG. 9B. That is, part of the support attachment unit 557 protrudes from the outer surface 162.

When the support attachment unit 557 moves from the first position to the second position, it is alright if the support thread 90 rotates in the R1 direction relative to the support attachment unit 557. That is, the support thread 90 may rotate in the R1 direction with respect to the support attachment unit 557 at the same time the support attachment unit 557 rotates in the R1 direction with respect to the holder portion 532.

When the support attachment unit 557 reaches the second position, rotation of the support thread 90 in the R1 direction with respect to the support attachment unit 557 either restarts or continues. When the support thread 90 is screwed into the first threaded hole 40a until the exposure face 559 hits the support, this completes the attachment of the support. In a state in which the support has been attached to the support attachment unit 557, the exposure face 559 is pressed against the support with enough pressure to allow the camera body 500 to be supported.

As shown in FIG. 9B, when the support attachment unit 557 is disposed at the second position, part of the support attachment unit 557 protrudes from the outer surface 162. In this embodiment, since the amount of protrusion of the support attachment unit 557 at the second position is small, the support can hold up the camera body 500 via the outer surface 462. For example, even if the camera body 500 is subjected to a force that tries to tilt it with respect to the support, no excessive force will be exerted on the support attachment unit 557. More specifically, since the gap formed between the support and the outer surface 462 can be kept small with the camera body 500, the support and the outer surface 462 will come into contact even though the camera body 500 is tilted slightly with respect to the support. As a result, the camera body 500 is supported by the support via the outer surface 462. Thus, with the camera body 500, it is less likely that an excessive load will be exerted on the support attachment unit 557.

Removal

In a state in which a support has been attached to the support attachment unit 557, the support attachment unit 557 is disposed at the second position, and the exposure face 559 and the support come into contact. Since the first threaded hole 40a is formed to be compatible with a right-hand thread, the support thread 90 can be removed from the first threaded hole 40a by turning the support thread 90 in the R2 direction in FIG. 9C. That is, the support can be detached from the support attachment unit 557.

When the user turns the support thread 90 attached to the support attachment unit 557 in the R2 direction, a drive force is inputted in the R2 direction through the support thread 90 to the support attachment unit 557. As discussed above, since the frictional force between the second threaded hole 534a and the threaded part 60a is set relatively low, the support attachment unit 557 begins rotating in the R2 direction with respect to the holder portion 532. When the support attachment unit 557 rotates in the R2 direction, the large diameter part 60 is guided by the second threaded hole 534a and moves in the Z axis positive direction (that is, to the first receiver 555 side).

Figure 10C:
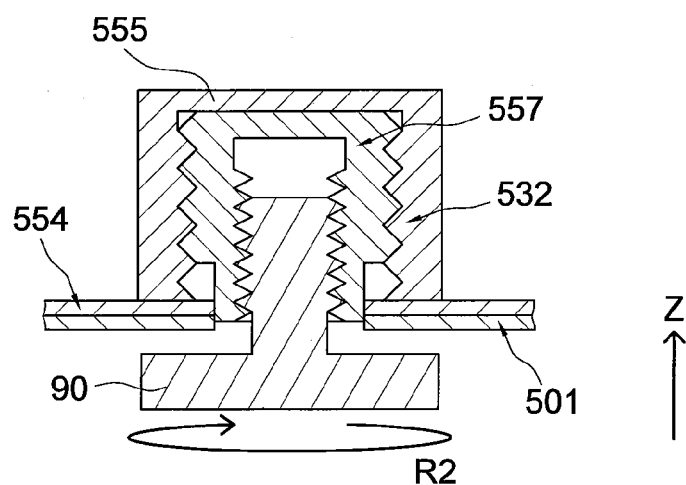
FIG. 10C is a diagram illustrating the operation of removing the support from the support attachment unit 557.

As shown in FIG. 10C, once the support attachment unit 557 rotates a certain amount in the R2 direction, the large diameter part 60 hits the first receiver 555. As a result, movement of the support attachment unit 557 is limited by the first receiver 555, and the support attachment unit 557 is stationary with respect to the first receiver 555. At this point the support attachment unit 557 is disposed at the first position.

When the support attachment unit 557 moves from the second position to the first position, it is alright if the support thread 90 rotates in the R2 direction relative to the support attachment unit 557. That is, the support thread 90 may rotate in the R2 direction with respect to the support attachment unit 557 at the same time the support attachment unit 557 rotates in the R2 direction with respect to the holder portion 532.

When the support attachment unit 557 reaches the first position, rotation of the support thread 90 in the R2 direction with respect to the support attachment unit 557 either restarts or continues. When the user continues to turn the support thread 90 in the R2 direction, the support thread 90 is removed from the first threaded hole 40a, and detachment of the support is completed.

Thus, with the camera body 500 according to this embodiment, the support attachment unit 557 is able to rotate integrally with the support, so when the user turns the support thread 90, the support attachment unit 557 rotates. Also, since the first threaded hole 40a is formed to be compatible with a right-hand thread, and the second threaded hole 534a is formed to be compatible with a left-hand thread, when the support attachment unit 557 rotates, the support attachment unit 557 moves in the opposite direction from the direction of advance of the support thread 90 with respect to the support attachment unit 557 (the Z axis negative direction). As a result, the support attachment unit 557 moves from the first position to the second position.

When the user turns the support thread 90 in order to remove the support from the support attachment unit 557, the support attachment unit 557 rotates integrally with the support thread 90 and moves from the second position to the first position.

Thus, in conjunction with the operation in which the user attaches the support, the support attachment unit 557 moves from the first position to the second position, and in conjunction with the operation in which the user removes the support, the support attachment unit 557 moves from the second position to the first position.

Other Embodiments

Embodiments of the present invention are not limited to what was given above, and various changes and modifications are possible without departing from the gist of the present invention.

(A)

In the above embodiments an interchangeable lens type of digital camera was described as an example, but the imaging device to which the technology disclosed herein can be applied is not limited to this. The technology disclosed herein can be applied to any imaging device having a support attachment unit, and can be applied, for example, to an interchangeable lens type of digital video camera, or to an integrated lens barrel type of digital camera or video camera.

(B)

A compression coil spring was used as the elastic member in the above embodiments, but the elastic member is not limited to a compression coil spring. For example, rubber or the like can also be used as the elastic member.

Also, a configuration in which the coil spring 160 (an elastic member) was used to move the support attachment unit 157 was described in the above embodiments, but the member or mechanism for movably supporting the support attachment unit 157 is not limited to being an elastic member. For instance, when no support is used, a magnet (an example of a holding member) can be used to hold the support attachment unit 157 at the first position, and when a support is attached, the support attachment unit 157 can be moved to the second position by thread tightening force. In short, as long as the configuration is such that the support attachment unit 157 is able to move between a first position and a second position, and the support attachment unit 157 can be held at the first position and the second position, any configuration may be used.

INDUSTRIAL APPLICABILITY

The technology disclosed herein can be utilized to dispose a support attachment unit at a position the user is unlikely to touch, and can be applied to any imaging device to which a support can be mounted. More specifically, the technology disclosed herein is useful and can be applied to digital still cameras, digital video cameras, and so forth.

REFERENCE SIGNS LIST 1 digital camera (an example of an imaging device)
10 support body unit
20 opening part
22 opening
30 plate portion
32 positioning portion
34 column portion
34a first column portion
34b second column portion
34c third column portion 34d fourth column portion
40 main body
40a first threaded hole
40b entrance
50 concave
100 camera body (an example of an imaging device)
101 housing
101a housing bottom portion
110 CMOS image sensor
113 CMOS circuit board
120 camera monitor
130 manipulation portion
131 release button
140 camera controller
142 main circuit board
150 body mount
154 main frame
154a frame bottom portion
154b frame front portion
155 first receiver
155-1, 155-2, 155-3, 155-4 first protrusion
156 second receiver
156-1, 156-2, 156-3, 156-4 second protrusion
157 support attachment unit
158 support attachment unit upper portion
159 exposure face
160 coil spring
162 outer surface
165 power supply
180 electronic viewfinder
190 shutter unit
200 lens unit
400 camera body (second embodiment)
401 housing
401a housing bottom portion
410 support body unit
432 positioning portion
434 column portions
434a first column portion
434b second column portion
434c third column portion
434d fourth column portion
436 base portion
462 outer surface
463 first receiver
463-1, 463-2, 463-3, 463-4 first protrusion
464 second receiver
464-1, 464-2, 464-3, 464-4 second protrusion
500 camera body (third embodiment)
501a housing bottom portion
510 support body unit
60 large diameter part
60a threaded part
62 small diameter part
532 holder portion
534 trunk part
534a second threaded hole
554 main frame
554a frame bottom portion
555 first receiver
556 second receiver
557 support attachment unit
559 exposure face

The invention claimed is:

1. An imaging device to which a support can be attached, the imaging device comprising:
a support attachment unit including a first threaded hole configured to be attached to the support, and an exposure face formed around the entrance of the first threaded hole; and
a support body unit including a housing having an opening configured to expose the exposure face and an outer surface formed around the opening, and movably supporting the support attachment unit, wherein:
the support attachment unit is disposed at a first position when the support is not attached, and is disposed at a second position when the support is attached;
the exposure face is recessed inside the outer surface of the housing when the support attachment unit is disposed at the first position; and
the exposure face and the outer surface are disposed within a same plane when the support attachment unit is disposed at the second position, or the support attachment unit protrudes from the outer surface when the support attachment unit is disposed at the second position.

2. The imaging device according to claim 1,
wherein the support attachment unit moves from the first position to the second position in conjunction with the operation of attaching the support attachment unit to the support, and
the support attachment unit moves from the second position to the first position in conjunction with the operation of removing the support from the support attachment unit.

3. The imaging device according to claim 1,
wherein the exposure face is in contact with the support when the support attachment unit is disposed at the second position.

4. The imaging device according to claim 1,
wherein the support body unit has a first receiver configured to limit movement of the support attachment unit with respect to the support body unit, and a second receiver disposed between the first receiver and the outer surface and configured to limit movement of the support attachment unit with respect to the support body unit, and
movement of the support attachment unit is limited by the first receiver when the support attachment unit is disposed at the first position, and movement of the support attachment unit is limited by the second receiver when the support attachment unit is disposed at the second position.

5. The imaging device according to claim 1, further comprising;
a holding member configured to hold the support attachment unit at the first position.

6. The imaging device according to claim 4,
wherein the first receiver is disposed on the opposite side of the support attachment unit from the exposure face.

7. The imaging device according to claim 4,
wherein the support attachment unit has a first portion disposed more to the first receiver side than the exposure face, and at least part of the first portion is disposed between the first receiver and the second receiver.

8. The imaging device according to claim 4,
wherein the first threaded hole has a center line, and
a first dimension in a first direction parallel to the center line of the first portion is smaller than a second dimension in the first direction of a gap between the first receiver and the second receiver.

9. The imaging device according to claim 4, further comprising;
- an elastic member configured to elastically link the support body unit and the support attachment unit,
- wherein, the elastic member presses the support attachment unit against the first receiver when the support is not attached to the support attachment unit.

10. The imaging device according to claim 4,
- wherein the support body unit has a second threaded hole formed between the first receiver and the second receiver, and
- the support attachment unit has a threaded part configured to be fitted into the second threaded hole, and movably mounted in the second threaded hole.

11. The imaging device according to claim 4,
- wherein the support body unit has a frame to ensure strength, and
- at least one of the first receiver and the second receiver is formed on the frame.

12. The imaging device according to claim 4,
- wherein the first receiver and/or the second receiver is formed on the housing.

13. The imaging device according to claim 7,
- wherein, the first portion is in contact with the first receiver at the first position, and
- the first portion is in contact with the second receiver at the second position.

14. The imaging device according to claim 8,
- wherein a first distance in the first direction between the outer surface and the exposure face at the first position is substantially equal to the difference between the second dimension and the first dimension, or is less than the difference between the second dimension and the first dimension.

15. The imaging device according to claim 9,
- wherein, the elastic member imparts elastic force to the support attachment unit so that the support attachment unit imaging device is disposed at the first position, when the support is not attached to the support attachment unit, and
- the elastic member contracts and the support attachment unit is disposed at the second position, when the support is attached to the support attachment unit.

16. The imaging device according to claim 9,
- wherein, the first receiver limits movement of the support attachment unit biased by the elastic member, so that the support attachment unit is disposed at the first position, when the support is not attached to the support attachment unit, and
- the second receiver limits movement of the support attachment unit accompanying contraction of the elastic member, so that the support attachment unit is disposed at the second position, when the support is attached to the support attachment unit.

17. The imaging device according to claim 10,
- wherein the threaded part is formed at the outer peripheral part of the first portion.

18. The imaging device according to claim 10,
- wherein the support attachment unit is configured to rotate integrally with the support with respect to the support body unit.

19. The imaging device according to claim 10,
- wherein the first threaded hole is formed with a right-hand thread, and the second threaded hole is formed with a left-hand thread.

20. The imaging device according to claim 10,
- wherein the pitch of the thread formed in the second threaded hole is greater than the pitch of the thread formed in the first threaded hole.

21. An imaging device to which a support can be attached, the imaging device comprising:
- a support attachment unit including a first threaded hole configured to be attached to the support, and an exposure face formed around the entrance of the first threaded hole; and
- a support body unit including a housing having an opening configured to expose the exposure face and an outer surface formed around the opening, and movably supporting the support attachment unit, wherein:
- the support attachment unit is disposed at a first position when the support is not attached, and is disposed at a second position when the support is attached;
- the exposure face is recessed inside the outer surface of the housing when the support attachment unit is disposed at the first position; and
- the exposure face and the outer surface are disposed within a same plane when the support attachment unit is disposed at the second position.

* * * * *